(12) United States Patent
Rowe et al.

(10) Patent No.: US 7,508,965 B2
(45) Date of Patent: *Mar. 24, 2009

(54) SYSTEM AND METHOD FOR ROBUST FINGERPRINT ACQUISITION

(75) Inventors: Robert K. Rowe, Corrales, NM (US); Ryan Martin, Albuquerque, NM (US)

(73) Assignee: Lumidigm, Inc., Albuquerque, NM (US)

( * ) Notice: Subject to any disclaimer, the term of this patent is extended or adjusted under 35 U.S.C. 154(b) by 61 days.

This patent is subject to a terminal disclaimer.

(21) Appl. No.: 11/605,807

(22) Filed: Nov. 28, 2006

(65) Prior Publication Data
US 2007/0116331 A1 May 24, 2007

Related U.S. Application Data

(63) Continuation-in-part of application No. 11/115,100, filed on Apr. 25, 2005.

(60) Provisional application No. 60/841,344, filed on Aug. 30, 2006, provisional application No. 60/659,024, filed on Mar. 4, 2005, provisional application No. 60/654,354, filed on Feb. 18, 2005, provisional application No. 60/610,802, filed on Sep. 17, 2004, provisional application No. 60/600,867, filed on Aug. 11, 2004, provisional application No. 60/576,364, filed on Jun. 1, 2004.

(51) Int. Cl.
*G06K 9/00* (2006.01)
(52) U.S. Cl. ............ 382/127; 382/124; 382/125
(58) Field of Classification Search .......... 382/124, 382/125; 340/5.53, 5.83
See application file for complete search history.

(56) References Cited

U.S. PATENT DOCUMENTS 3,508,830 A 4/1970 Hopkins et al.
(Continued)

FOREIGN PATENT DOCUMENTS

DE 10153808 5/2003
(Continued)

OTHER PUBLICATIONS

Bantle, John P. et al., "Glucose Measurement In Patients With Diabetes Mellitus With Dermal Interstitial Fluid," Mosby-Year Book, Inc., 9 pages, 1997.
(Continued)

*Primary Examiner*—Bhavesh Mehta
*Assistant Examiner*—John B Strege
(74) *Attorney, Agent, or Firm*—Townsend and Townsend and Crew LLP

(57) ABSTRACT

Combined multispectral and total-internal-reflectance biometric imaging systems are disclosed. A platen has multiple facets, at least one of which has a surface adapted for placement of a purported skin site by an individual and another facet may include an optical absorber. An illumination source and an optical arrangement are disposed to illuminate the purported skin site with light from the illumination source along distinct illumination paths, including paths at angles less than the critical angle and paths at angles greater than the critical angle. Both multispectral and total-internal-reflectance illumination are received by an imaging system. The imaging system may include first and second imaging locations adapted to record images from separate illumination paths. The platen may also include non parallel exits facets.

25 Claims, 15 Drawing Sheets
(3 of 15 Drawing Sheet(s) Filed in Color)

U.S. PATENT DOCUMENTS

| | | |
|---|---|---|
| 3,910,701 A | 10/1975 | Henderson et al. |
| RE29,008 E | 10/1976 | Ott |
| 4,035,083 A | 7/1977 | Woodriff et al. |
| 4,142,797 A | 3/1979 | Astheimer |
| 4,169,676 A | 10/1979 | Kaiser |
| 4,170,987 A | 10/1979 | Anselmo et al. |
| 4,260,220 A | 4/1981 | Whitehead |
| 4,322,163 A | 3/1982 | Schiller |
| 4,427,889 A | 1/1984 | Muller |
| 4,537,484 A | 8/1985 | Fowler |
| 4,598,715 A | 7/1986 | Machler et al. |
| 4,653,880 A | 3/1987 | Sting et al. |
| 4,654,530 A | 3/1987 | Dybwad |
| 4,655,225 A | 4/1987 | Dahne et al. |
| 4,656,562 A | 4/1987 | Sugino |
| 4,657,397 A | 4/1987 | Oehler et al. |
| 4,661,706 A | 4/1987 | Messerschmidt et al. |
| 4,684,255 A | 8/1987 | Ford |
| 4,699,149 A | 10/1987 | Rice |
| 4,712,912 A | 12/1987 | Messerschmidt |
| 4,730,882 A | 3/1988 | Messerschmidt |
| 4,747,147 A | 5/1988 | Sparrow |
| 4,787,013 A | 11/1988 | Sugino et al. |
| 4,787,708 A | 11/1988 | Whitehead |
| 4,830,496 A | 5/1989 | Young |
| 4,853,542 A | 8/1989 | Milosevic et al. |
| 4,857,735 A | 8/1989 | Noller |
| 4,859,064 A | 8/1989 | Messerschmidt et al. |
| 4,866,644 A | 9/1989 | Shenk et al. |
| 4,867,557 A | 9/1989 | Takatani et al. |
| 4,882,492 A | 11/1989 | Schlager |
| 4,883,953 A | 11/1989 | Koashi et al. |
| 4,936,680 A | 6/1990 | Henkes et al. |
| 4,944,021 A | 7/1990 | Hoshino et al. |
| 4,975,581 A | 12/1990 | Robinson et al. |
| 5,015,100 A | 5/1991 | Doyle |
| 5,019,715 A | 5/1991 | Sting et al. |
| 5,028,787 A | 7/1991 | Rosenthal et al. |
| 5,051,602 A | 9/1991 | Sting et al. |
| 5,068,536 A | 11/1991 | Rosenthal |
| 5,070,874 A | 12/1991 | Barnes et al. |
| 5,077,803 A | 12/1991 | Kato et al. |
| 5,109,428 A * | 4/1992 | Igaki et al. .................. 382/125 |
| 5,146,102 A | 9/1992 | Higuchi et al. |
| 5,158,082 A | 10/1992 | Jones |
| 5,163,094 A | 11/1992 | Prokoski et al. |
| 5,177,802 A | 1/1993 | Fujimoto et al. |
| 5,178,142 A | 1/1993 | Harjunmaa et al. |
| 5,179,951 A | 1/1993 | Knudson |
| 5,204,532 A | 4/1993 | Rosenthal |
| 5,222,495 A | 6/1993 | Clarke et al. |
| 5,222,496 A | 6/1993 | Clarke et al. |
| 5,223,715 A | 6/1993 | Taylor |
| 5,225,678 A | 7/1993 | Messerschmidt |
| 5,230,702 A | 7/1993 | Lindsay et al. |
| 5,237,178 A | 8/1993 | Rosenthal et al. |
| 5,243,546 A | 9/1993 | Maggard |
| 5,257,086 A | 10/1993 | Fateley et al. |
| 5,258,922 A | 11/1993 | Grill |
| 5,267,152 A | 11/1993 | Yang et al. |
| 5,268,749 A | 12/1993 | Weber et al. |
| 5,291,560 A | 3/1994 | Daugman |
| 5,299,570 A | 4/1994 | Hatschek |
| 5,303,026 A | 4/1994 | Strobl et al. |
| 5,311,021 A | 5/1994 | Messerschmidt |
| 5,313,941 A | 5/1994 | Braig et al. |
| 5,321,265 A | 6/1994 | Block |
| 5,331,958 A | 7/1994 | Oppenheimer |
| 5,348,003 A | 9/1994 | Caro |
| 5,351,686 A | 10/1994 | Steuer et al. |
| 5,355,880 A | 10/1994 | Thomas et al. |
| 5,360,004 A | 11/1994 | Purdy et al. |
| 5,361,758 A | 11/1994 | Hall et al. |
| 5,366,903 A | 11/1994 | Lundsgaard et al. |
| 5,372,135 A | 12/1994 | Mendelson et al. |
| 5,379,764 A | 1/1995 | Barnes et al. |
| 5,402,778 A | 4/1995 | Chance |
| 5,405,315 A | 4/1995 | Khuri et al. |
| 5,413,096 A | 5/1995 | Hart |
| 5,413,098 A | 5/1995 | Benaron et al. |
| 5,419,321 A | 5/1995 | Evans |
| 5,435,309 A | 7/1995 | Thomas et al. |
| 5,441,053 A | 8/1995 | Lodder et al. |
| 5,452,723 A | 9/1995 | Wu et al. |
| 5,459,317 A | 10/1995 | Small et al. |
| 5,459,677 A | 10/1995 | Kowalski et al. |
| 5,460,177 A | 10/1995 | Purdy et al. |
| 5,483,335 A | 1/1996 | Tobias |
| 5,494,032 A | 2/1996 | Robinson et al. |
| 5,505,726 A | 4/1996 | Meserol |
| 5,507,723 A | 4/1996 | Keshaviah |
| 5,515,847 A | 5/1996 | Braig et al. |
| 5,518,623 A | 5/1996 | Keshaviah et al. |
| 5,523,054 A | 6/1996 | Switalski et al. |
| 5,533,509 A | 7/1996 | Koashi et al. |
| 5,537,208 A | 7/1996 | Bertram et al. |
| 5,539,207 A | 7/1996 | Wong et al. |
| 5,552,997 A | 9/1996 | Massart |
| 5,559,504 A | 9/1996 | Itsumi et al. |
| 5,568,251 A | 10/1996 | Davies et al. |
| 5,596,992 A | 1/1997 | Haaland et al. |
| 5,606,164 A | 2/1997 | Price et al. |
| 5,613,014 A | 3/1997 | Eshera et al. |
| 5,630,413 A | 5/1997 | Thomas et al. |
| 5,636,633 A | 6/1997 | Messerschmidt et al. |
| 5,655,530 A | 8/1997 | Messerschmidt |
| 5,672,864 A | 9/1997 | Kaplan |
| 5,672,875 A | 9/1997 | Block et al. |
| 5,677,762 A | 10/1997 | Ortyn et al. |
| 5,681,273 A | 10/1997 | Brown |
| 5,708,593 A | 1/1998 | Saby et al. |
| 5,719,399 A | 2/1998 | Alfano et al. |
| 5,719,950 A | 2/1998 | Osten et al. |
| 5,724,268 A | 3/1998 | Sodickson et al. |
| 5,737,439 A | 4/1998 | Lapsley et al. |
| 5,743,262 A | 4/1998 | Lepper, Jr. et al. |
| 5,747,806 A | 5/1998 | Khalil |
| 5,750,994 A | 5/1998 | Schlager |
| 5,751,835 A | 5/1998 | Topping et al. |
| 5,761,330 A | 6/1998 | Stoianov et al. |
| 5,782,755 A | 7/1998 | Chance et al. |
| 5,792,050 A | 8/1998 | Alam et al. |
| 5,792,053 A | 8/1998 | Skladner et al. |
| 5,793,881 A | 8/1998 | Stiver et al. |
| 5,796,858 A | 8/1998 | Zhou et al. |
| 5,808,739 A | 9/1998 | Turner et al. |
| 5,818,048 A | 10/1998 | Sodickson et al. |
| 5,823,951 A | 10/1998 | Messerschmidt et al. |
| 5,828,066 A | 10/1998 | Messerschmidt |
| 5,830,132 A | 11/1998 | Robinson |
| 5,830,133 A | 11/1998 | Osten et al. |
| 5,850,623 A | 12/1998 | Carman, Jr. et al. |
| 5,853,370 A | 12/1998 | Chance et al. |
| 5,857,462 A | 1/1999 | Thomas et al. |
| 5,860,421 A | 1/1999 | Eppstein et al. |
| 5,867,265 A | 2/1999 | Thomas |
| 5,886,347 A | 3/1999 | Inoue et al. |
| 5,902,033 A | 5/1999 | Levis et al. |
| 5,914,780 A | 6/1999 | Turner et al. |
| 5,929,443 A | 7/1999 | Alfano et al. |
| 5,933,792 A | 8/1999 | Anderson et al. |
| 5,935,062 A | 8/1999 | Messerschmidt et al. |
| 5,945,676 A | 8/1999 | Khalil |
| 5,949,543 A | 9/1999 | Bleier et al. |

| | | |
|---|---|---|
| 5,957,841 A | 9/1999 | Maruo et al. |
| 5,961,449 A | 10/1999 | Toida et al. |
| 5,963,319 A | 10/1999 | Jarvis et al. |
| 5,987,346 A | 11/1999 | Benaron et al. |
| 5,999,637 A | 12/1999 | Toyoda et al. |
| 6,005,722 A | 12/1999 | Butterworth et al. |
| 6,016,435 A | 1/2000 | Maruo et al. |
| 6,025,597 A | 2/2000 | Sterling et al. |
| 6,026,314 A | 2/2000 | Amerov et al. |
| 6,028,773 A | 2/2000 | Hundt |
| 6,031,609 A | 2/2000 | Funk et al. |
| 6,034,370 A | 3/2000 | Messerschmidt |
| 6,040,578 A | 3/2000 | Malin et al. |
| 6,041,247 A | 3/2000 | Weckstrom et al. |
| 6,041,410 A | 3/2000 | Hsu et al. |
| 6,043,492 A | 3/2000 | Lee et al. |
| 6,044,285 A | 3/2000 | Chaiken et al. |
| 6,045,502 A | 4/2000 | Eppstein et al. |
| 6,046,808 A | 4/2000 | Fately |
| 6,049,727 A | 4/2000 | Crothall |
| 6,056,738 A | 5/2000 | Marchitto et al. |
| 6,057,925 A | 5/2000 | Anthon |
| 6,061,581 A | 5/2000 | Alam et al. |
| 6,061,582 A | 5/2000 | Small et al. |
| 6,066,847 A | 5/2000 | Rosenthal |
| 6,069,689 A | 5/2000 | Zeng et al. |
| 6,070,093 A | 5/2000 | Oosta et al. |
| 6,073,037 A | 6/2000 | Alam et al. |
| 6,088,605 A | 7/2000 | Griffith et al. |
| 6,088,607 A | 7/2000 | Diab et al. |
| 6,097,035 A | 8/2000 | Belongie et al. |
| 6,100,811 A | 8/2000 | Hsu et al. |
| 6,115,484 A | 9/2000 | Bowker et al. |
| 6,115,673 A | 9/2000 | Malin et al. |
| 6,122,042 A | 9/2000 | Wunderman et al. |
| 6,122,394 A | 9/2000 | Neukermans et al. |
| 6,122,737 A | 9/2000 | Bjorn et al. |
| 6,125,192 A | 9/2000 | Bjorn et al. |
| 6,141,101 A | 10/2000 | Bleier et al. |
| 6,147,749 A | 11/2000 | Kubo et al. |
| 6,148,094 A | 11/2000 | Kinsella |
| 6,152,876 A | 11/2000 | Robinson et al. |
| 6,154,658 A | 11/2000 | Caci |
| 6,157,041 A | 12/2000 | Thomas et al. |
| 6,159,147 A | 12/2000 | Lichter et al. |
| 6,172,743 B1 | 1/2001 | Kley et al. |
| 6,175,407 B1 | 1/2001 | Sartor |
| 6,181,414 B1 | 1/2001 | Raz et al. |
| 6,181,958 B1 | 1/2001 | Steuer et al. |
| 6,188,781 B1 | 2/2001 | Brownlee |
| 6,208,749 B1 | 3/2001 | Gutkowicz-Krusin |
| 6,212,424 B1 | 4/2001 | Robinson |
| 6,226,541 B1 | 5/2001 | Eppstein et al. |
| 6,230,034 B1 | 5/2001 | Messerschmidt et al. |
| 6,240,306 B1 | 5/2001 | Rohrscheib et al. |
| 6,240,309 B1 | 5/2001 | Yamashita et al. |
| 6,241,663 B1 | 6/2001 | Wu et al. |
| 6,256,523 B1 | 7/2001 | Diab et al. |
| 6,272,367 B1 | 8/2001 | Chance |
| 6,280,381 B1 | 8/2001 | Malin et al. |
| 6,282,303 B1 | 8/2001 | Brownlee |
| 6,285,895 B1 | 9/2001 | Ristolainen et al. |
| 6,292,576 B1 | 9/2001 | Brownlee |
| 6,301,375 B1 | 10/2001 | Choi |
| 6,301,815 B1 | 10/2001 | Sliwa |
| 6,304,767 B1 | 10/2001 | Soller et al. |
| 6,307,633 B1 | 10/2001 | Mandella et al. |
| 6,309,884 B1 | 10/2001 | Cooper et al. |
| 6,317,507 B1 | 11/2001 | Dolfing et al. |
| 6,324,310 B1 | 11/2001 | Brownlee |
| 6,330,346 B1 | 12/2001 | Peterson et al. |
| 6,404,904 B1 | 6/2002 | Einighammer et al. |
| 6,419,361 B2 | 7/2002 | Cabib et al. |
| 6,483,929 B1 | 11/2002 | Murakami et al. |
| 6,504,614 B1 | 1/2003 | Messerschmidt et al. |
| 6,537,225 B1 | 3/2003 | Mills |
| 6,560,352 B2 | 5/2003 | Rowe et al. |
| 6,574,490 B2 | 6/2003 | Abbink et al. |
| 6,606,509 B2 | 8/2003 | Schmitt |
| 6,628,809 B1 | 9/2003 | Rowe et al. |
| 6,631,199 B1 | 10/2003 | Topping et al. |
| 6,741,729 B2 | 5/2004 | Bjorn et al. |
| 6,799,275 B1 | 9/2004 | Bjorn |
| 6,799,726 B2 | 10/2004 | Stockhammer |
| 6,816,605 B2 | 11/2004 | Rowe et al. |
| 6,825,930 B2 | 11/2004 | Cronin et al. |
| 6,928,181 B2 | 8/2005 | Brooks |
| 6,937,885 B1 | 8/2005 | Lewis et al. |
| 6,958,194 B1 | 10/2005 | Hopper et al. |
| 6,995,384 B2 | 2/2006 | Lee et al. |
| 7,147,153 B2 | 12/2006 | Rowe et al. |
| 2002/0009213 A1 | 1/2002 | Rowe et al. |
| 2002/0101566 A1 | 8/2002 | Elsner et al. |
| 2002/0171834 A1 | 11/2002 | Rowe et al. |
| 2002/0183624 A1 | 12/2002 | Rowe et al. |
| 2003/0044051 A1 | 3/2003 | Fujieda |
| 2003/0044501 A1 | 3/2003 | Fujieda |
| 2003/0078504 A1 | 4/2003 | Rowe |
| 2003/0223621 A1 | 12/2003 | Rowe et al. |
| 2004/0008875 A1 | 1/2004 | Linares |
| 2004/0047493 A1 | 3/2004 | Rowe et al. |
| 2004/0114783 A1 | 6/2004 | Spycher et al. |
| 2004/0179722 A1 | 9/2004 | Moritoki et al. |
| 2004/0240712 A1 | 12/2004 | Rowe et al. |
| 2005/0007582 A1 | 1/2005 | Villers et al. |
| 2005/0180620 A1 | 8/2005 | Takiguchi |
| 2005/0185847 A1 | 8/2005 | Rowe |
| 2005/0205667 A1 | 9/2005 | Rowe |
| 2005/0265585 A1 | 12/2005 | Rowe |
| 2005/0265586 A1 | 12/2005 | Rowe et al. |
| 2005/0271258 A1 | 12/2005 | Rowe |
| 2006/0002597 A1 | 1/2006 | Rowe |
| 2006/0002598 A1 | 1/2006 | Rowe et al. |
| 2006/0115128 A1 | 6/2006 | Mainguet |
| 2006/0202028 A1 | 9/2006 | Rowe |
| 2006/0210120 A1 | 9/2006 | Rowe |
| 2006/0274921 A1 | 12/2006 | Rowe |

FOREIGN PATENT DOCUMENTS

| | | |
|---|---|---|
| EP | 0 280 418 A1 | 8/1988 |
| EP | 0 372 748 | 6/1990 |
| EP | 0 897 164 A2 | 2/1999 |
| EP | 0 924 656 A2 | 6/1999 |
| EP | 1 353 292 | 10/2003 |
| EP | 1 434 162 A2 | 6/2004 |
| FR | 2761180 A1 | 9/1998 |
| JP | 2001-184490 A | 7/2001 |
| JP | 2002-133402 A | 5/2002 |
| JP | 2003-308520 A | 10/2003 |
| WO | WO 92/00513 A1 | 1/1992 |
| WO | WO 92/17765 A1 | 10/1992 |
| WO | WO 93/07801 A1 | 4/1993 |
| WO | WO 01/18332 A1 | 3/2001 |
| WO | WO 01/27882 A2 | 4/2001 |
| WO | WO 01/52180 A1 | 7/2001 |
| WO | WO 01/52726 A1 | 7/2001 |
| WO | WO 01/53805 A1 | 7/2001 |
| WO | WO 01/65471 A | 9/2001 |
| WO | WO 02/084605 A2 | 10/2002 |
| WO | WO 02/099393 A2 | 12/2002 |
| WO | WO 03/096272 A1 | 11/2003 |
| WO | 2004-068394 | 8/2004 |
| WO | WO 2004/068388 A2 | 8/2004 |
| WO | WO 2004/068394 A1 | 8/2004 |
| WO | WO 2004/090786 | 10/2004 |

WO  WO 2006/049394 A  5/2006

OTHER PUBLICATIONS

Berkoben, Michael S. et al., "Vascular Access For Hemodialysis," Clinical Dialysis, Third Edition, pp. 2 cover pages and 26-45, 1995.
Bleyer, Anthony J. et al., "The Costs Of Hospitalizations Due To Hemodialysis Access Management," Nephrology News & Issues, pp. 19, 20 and 22, Jan. 1995.
Daugirdas, JT et al., "Comparison Of Methods To Predict The Equilibrated Kt/V (eKt/V) In The Hemo Study," National Institutes of Health, pp. 1-28, Aug. 20, 1996.
Demos, S. G. et al., "Optical Fingerprinting Using Polarisation Contrast Improvement," Electronics Letters, vol. 33, No. 7, pp. 582-584, Mar. 27, 1997.
Depner, Thomas A. et al., "Clinical Measurement Of Blood Flow In Hemodialysis Access Fistulae And Grafts By Ultrasound Dilution," Division of Nephrology, University of California, pp. M745-M748, published on or before Oct. 30, 1997.
Fresenius USA, "Determination Of Delivered Therapy Through Measurement Of Effective Clearance," 2 pages, Dec. 1994.
Hakim, Raymond M. et al., "Effects Of Dose Of Dialysis On Morbidity And Mortality," American Journal of Kidney Diseases, vol. 23, No. 5, pp. 661-669, May 1994.
Jacobs, Paul et al., "A Disposable Urea Sensor For Continuous Monitoring Of Hemodialysis Efficiency," ASAIO Journal, pp. M353-M358, 1993.
Keshaviah, Prakash R. et al., "On-Line Monitoring Of The Delivery Of The Hemodialysis Prescription," Pediatric Nephrology, vol. 9, pp. S2-S8, 1995.
Krivitski, Nikolai M., "Theory And Validation Of Access Flow Measurement By Dilution Technique During Hemodialysis," Kidney International, vol. 48, pp. 244-250, 1995.
Marbach, Ralf, "Measurement Techniques For IR Spectroscopic Blood Glucose Determination," Fortschritt Bericht, Series 8: Measurement And Control Technology, No. 346, pp. cover and 1-158, Mar. 28, 1994.
Mardia, K. V. et al., "Chapter 11—Discriminant Analysis," Multivariate Analysis, pp. 2 cover pages and 300-325, 1979.
Nichols, Michael G. et al., "Design And Testing Of A White-Light, Steady-State Diffuse Reflectance Spectrometer For Determination Of Optical Properties Of Highly Scattering Systems," Applied Optics, vol. 36, No. 1, pp. 93-104, Jan. 1, 1997.
Ripley, B. D., "Chapter 3—Linear Discriminant Analysis," Pattern Recognition And Neural Networks, pp. 3 cover pages and 91-120, 1996.
Ronco, C. et al., "On-Line Urea Monitoring : A Further Step Towards Adequate Dialysis Prescription And Delivery," The International Journal of Artificial Organs, vol. 18, No. 9, pp. 534-543, 1995.
Service, F. John et al., "Dermal Interstitial Glucose As An Indicator Of Ambient Glycemia," Diabetes Care, vol. 20, No. 9, 8 pages, Aug. 1997.
Sherman, Richard A., "Chapter 4—Recirculation In The Hemodialysis Access," Principles and Practice of Dialysis, pp. 2 cover pages and 38-46, 1994.
Sherman, Richard A., "The Measurement Of Dialysis Access Recirculation," American Journal of Kidney Diseases, vol. 22, No. 4, pp. 616-621, Oct. 1998.
Steuer, Robert R. et al., "A New Optical Technique For Monitoring Hematocrit And Circulating Blood Volume: Its Application In Renal Dialysis," Dialysis & Transplantation, vol. 22, No. 5, pp. 260-265, May 1993.
Webb, Paul, "Temperatures Of Skin, Subcutaneous Tissue, Muscle And Core In Resting Men In Cold, Comfortable And Hot Conditions," European Journal of Applied Physiology, vol. 64, pp. 471-476, 1992.
Zavala, Albert et al., "Using Fingerprint Measures To Predict Other Anthropometric Variables," Human Factors, vol. 17, No. 6, pp. 591-602, 1975.
Nixon, Kristin A., et al., "Novel Spectroscopy-Based Technology for Biometric and Liveness Verification", Biometric Technology for Human Identification, Proceedings of SPIE, vol. 5404, No. 1, XP-002458441, Apr. 12-13, 2004, pp. 287-295 (ISSN: 0277-786X).
Anderson, C. E. et al., "Fundamentals of Calibration Transfer Through Procrustes Analysis," Appln. Spectros., vol. 53, No. 10 (1999) p. 1268-1276.
Ashbourn, Julian, Biometrics; Advanced Identity Verification, Springer, 2000, pp. 63-4).
Blank, T.B. et al., "Transfer of Near-Infrared Multivariate Calibrations Without Standards," Anal. Chem., vol. 68 (1996) p. 2987.
Brasunas John C. et al., "Uniform Time-Sampling Fourier Transform Spectroscopy," Applied Optics, vol. 36, No. 10, Apr. 1, 1997, pp. 2206-2210.
Brault, James W., "New Approach to High-Precision Fourier Transform Spectrometer Design," Applied Optics, Vo. 35, No. 16, Jun. 1, 1996, pp. 2891-2896.
Brochure entitled "Improve the Clinical Outcome of Every Patient", In Line Diagnostics, published on or before Oct. 30, 1997, 2 pages.
Cassarly, W.J. et al., "Distributed Lighting Systems: Uniform Light Delivery," Source Unknown, pp. 1698-1702.
Chang, Chong-Min et al., "An Uniform Rectangular Illuminating Optical System for Liquid Crystal Light Valve Projectors," Euro Display '96 pp. 257-260.
Coyne, Lawrence J. et al., "Distributive Fiber Optic couplers Using Rectangular Lightguides as Mixing Elements," (Information Gatekeepers, Inc. Brookline, MA, 1979) pp. 160-164.
de Noord, Onno E., "Multivariate Calibration Standardization," Chemometrics and intelligent Laboratory Systems 25, (1994) pp. 85-97.
Despain, Alvin M. et al., "A Large-Aperture Field-Widened Interferometer-Spectrometer for Airglow Studies," Aspen International Conference on Fourier Spectroscopy, 1970, pp. 293-300.
Faber, Nicolaas, "Multivariate Sensitivity for the Interpretation of the Effect of Spectral Pretreatment Methods on Near-Infrared Calibration Model Predictions," Analytical Chemistry, vol. 71, No. 3, Feb. 1, 1999, pp. 557-565.
Geladi, Paul et al., A Multivariate NIR Study of Skin Alterations in Diabetic Patients as Compared to Control Subjects, J. Near Infrared Spectrosc., vol. 8 (2000) pp. 217-227.
Lee et al., "Fingerprint Recognition Using Principal Gabor Basis Function", Proceedings of 2001 International Symposium on Intelligent Multimedia, Video and Speech Processing, May 2-4, 2001, Sections 2-3.
Pan et al., "Face Recognition in Hyperspectral Images", IEEE Transactions on Pattern Analysis and Machine Intelligence vol. 25, No. 12, Dec. 2003.
Ross et al., "A Hybrid Fingerprint Matcher," Pattern Recognition 36, The Journal of the Pattern Recognition Society, 2003 Elsevier Science Ltd., pp. 1661-1673.
Selvaraj et al., Fingerprint Verification Using Wavelet Transform, Proceedings of the Fifth International Conference on Computational Intelligence and Multimedia Applications, IEEE, 2003.

* cited by examiner

SYSTEM AND METHOD FOR ROBUST FINGERPRINT ACQUISITION

CROSS REFERENCE TO RELATED APPLICATIONS

This application claims the benefit of U.S. Provisional Application No. 60/841,344 filed Aug. 30, 2006, entitled "SYSTEM AND METHOD FOR ROBUST FINGERPRINT ACQUISITION" which disclosure is incorporated herein by reference for all purposes.

This application is a continuation in part application of U.S. application Ser. No. 11/115,100, entitled "MULTI-SPECTRAL IMAGING BIOMETRICS," filed Apr. 25, 2005, by Robert K. Rowe ("the multispectral application"), which is a nonprovisional of, and claims the benefit of the filing date of each of the following applications: U.S. Prov. Pat. Appl. No. 60/576,364, entitled "MULTISPECTRAL FINGER RECOGNITION," filed Jun. 1, 2004, by Robert K. Rowe and Stephen P. Corcoran; U.S. Prov. Pat. Appl. No. 60/600,867, entitled "MULTISPECTRAL IMAGING BIOMETRIC," filed Aug. 11, 2004, by Robert K. Rowe; U.S. Prov. Pat. Appl. No. 60/610,802, entitled "FINGERPRINT SPOOF DETECTION USING MULTISPECTRAL IMAGING," filed Sep. 17, 2004, by Robert K. Rowe; U.S. Prov. Pat. Appl. No. 60/654,354, entitled "SYSTEMS AND METHODS FOR MULTISPECTRAL FINGERPRINT SENSING," filed Feb. 18, 2005, by Robert K. Rowe; and U.S. Prov. Pat. Appl. No. 60/659,024, entitled "MULTISPECTRAL IMAGING OF THE FINGER FOR BIOMETRICS," filed Mar. 4, 2005, by Robert K. Rowe et al, the entire disclosures of each of which are incorporated herein by reference for all purposes in their entirety.

This application is related to copending, commonly assigned U.S. patent application Ser. No. 11/009,372, entitled "METHODS AND SYSTEMS FOR ESTIMATION OF PERSONAL CHARACTERISTICS FROM BIOMETRIC MEASUREMENTS," filed Dec. 9, 2004, by Robert K. Rowe, U.S. patent application Ser. No. 11/115,101, entitled "MULTISPECTRAL BIOMETRIC IMAGING," filed Apr. 25, 2005, by Robert K. Rowe et al. and U.S. patent application Ser. No. 11/115,075, entitled "MULTISPECTRAL LIVENESS DETERMINATION," filed Apr. 25, 2005, by Robert K. Rowe, the entire disclosures of each of which are incorporated herein by reference for all purposes in their entirety.

BACKGROUND OF THE INVENTION

This application relates generally to biometrics. More specifically, this application relates to biometric identification.

"Biometrics" refers generally to the statistical analysis of characteristics of living bodies. One category of biometrics includes "biometric identification," which commonly operates under one of two modes to provide automatic identification of people or to verify purported identities of people. Biometric sensing technologies measure the physical features or behavioral characteristics of a person and compare those features to similar prerecorded measurements to determine whether there is a match. Physical features that are commonly used for biometric identification include faces, irises, hand geometry, vein structure, and fingerprint patterns, which is the most prevalent of all biometric-identification features. Current methods for analyzing collected fingerprints include optical, capacitive, radio-frequency, thermal, ultrasonic, and several other less common techniques.

Most of the fingerprint-collection methods rely on measuring characteristics of the skin at or very near the surface of a finger. In particular, optical fingerprint readers typically rely on the presence or absence of a difference in the index of refraction between the sensor platen and the finger placed on it. When the angle of light at an interface is greater than the critical angle and an air-filled valley of the fingerprint is present at a particular location of the platen, total internal reflectance ("TIR") occurs in the platen because of the air-platen index difference. Alternatively, if skin of the proper index of refraction is in optical contact with the platen, the TIR at this location is "frustrated," allowing light to traverse the platen-skin interface. A map of the differences in TIR across the region where the finger is touching the platen forms the basis for a conventional optical fingerprint reading. There are a number of optical arrangements used to detect this variation of the optical interface in both bright-field and dark-field optical arrangements. Commonly, a single quasimonochromatic beam of light is used to perform this TIR-based measurement.

There also exists non-TIR optical fingerprint sensors. Some non-TIR contact sensors rely on some arrangement of quasimonochromatic light to illuminate the front, sides, or back of a fingertip, causing the light to diffuse through the skin. The fingerprint image is formed because of the differences in light transmission through the finger and across the skin-platen interface for the ridge and valleys. The difference in optical transmission at the interface is due to changes in the Fresnel reflection characteristics that result from the presence or absence of intermediate air gaps in the valleys. Some non-TIR sensors are non-contact sensors, which use polarized light to image the surface features of the finger. In some cases the imaging system may include a linear polarizer and the illumination light may be polarized in parallel and perpendicular directions to provide two images, which are then combined in some manner to enhance the surface features of the finger.

Although optical fingerprint readers based on TIR phenomena are one of the most commonly deployed types of fingerprint sensors, they are susceptible to image-quality problems due to non-ideal conditions. If the skin is overly dry, the index match with the platen will be compromised, resulting in poor image contrast. Similarly, if the finger is very wet, the valleys may fill with water, causing an optical coupling to occur all across the fingerprint region and greatly reduce image contrast. Similar effects may occur if the pressure of the finger on the platen is too little or too great, the skin or sensor is dirty, the skin is aged and/or worn, or overly fine features are present such as may be the case for certain ethnic groups and in very young children. These effects decrease image quality and thereby decrease the overall performance of the fingerprint sensor. In one recent study, 16% of fingerprint images were found to be of suboptimal image quality as a result of these effects. In some cases, commercial optical fingerprint readers incorporate a thin membrane of soft material such as silicone to help mitigate some of these effects and restore performance. As a soft material, the membrane is subject to damage, wear, and contamination, limiting the use of the sensor before it requires maintenance.

Biometric sensors, particularly fingerprint biometric sensors, are generally prone to being defeated by various forms of spoof samples. In the case of fingerprint readers, a variety of methods are known in the art for presenting readers with a fingerprint pattern of an authorized user that is embedded in some kind of inanimate material such as paper, gelatin, epoxy, latex, or the like. Thus, even if a fingerprint reader can be considered to reliably determine the presence or absence of a matching fingerprint pattern, it is also critical to the overall system security to ensure that the matching pattern is being acquired from a genuine, living finger, which is difficult to ascertain with many existing sensors.

There is accordingly a general need in the art for improved methods and systems for biometric sensing.

BRIEF SUMMARY OF THE INVENTION

Embodiments of the invention provide a biometric measurement device that comprises one or more light sources, a refractive element, and a single imaging array arranged so that TIR and multispectral images are observed on a single stationary detector. In various configurations, other elements of the system may be stationary or moveable. For example, there are numerous configurations within the scope of the invention where one or more of the optical components moves to capture the TIR and multispectral images.

In a first set of embodiments, a combined multispectral and TIR biometric imaging system is provided. A platen has a plurality of facets. One of the facets comprises a surface adapted for placement of a purported skin site by an individual. An illumination source and an optical arrangement are disposed to illuminate the purported skin site with light from the illumination source along a plurality of distinct illumination paths. A first illumination path encounters the surface at an angle less than a critical angle of an interface defined by the surface. A second illumination path encounters the surface at an angle greater than the critical angle. An imaging system is disposed to receive light from the surface. Light propagated from the illumination source along the first illumination path is received directly by the imaging system after scattering from the purported skin site when the purported skin site is placed on the surface. Light propagated from the illumination source along the second illumination path is received by the imaging system when TIR is frustrated by a presence of the purported skin site on the surface.

In some of these embodiments, light propagated from the illumination source along the second illumination path that undergoes TIR encounters a facet of the platen that comprises an optical absorber.

A second set of embodiments has a similar structure, including a platen with a plurality of facets, one of which comprises a surface adapted for placement of a purported skin site by an individual. An illumination source and optical arrangement are also disposed to illuminate the purported skin site with light from the illumination source along a plurality of distinct illumination paths, a first of which encounters the surface and an angle less than the critical angle and a second of which encounters the surface at an angle greater than the critical angle. In these embodiments, an imaging system is disposed to receive light from the surface along a plurality of distinct optical detection paths. Light propagated from the illumination source along the first illumination path is received along a first of the detection paths after scattering from the purported skin site. Light scattered from the illumination source along the second illumination path is received by the imaging system after TIR from the surface.

In some of these embodiments, light propagated along the first and second detection paths exit the platen through different facets of the platen.

In both sets of embodiments, there are a variety of characteristics that may be provided for the illumination sources and imaging system. For example, the illumination source may comprise a plurality of illumination sources, with a first of the illumination sources being disposed to provide light along the first illumination path and a second of the illumination sources being disposed to provide light along the second illumination path. Each of the first and second illumination sources may be substantially monochromatic, or one or both of them may comprise a broad-band illumination source in different embodiments. The imaging system may comprise a color imager. Alternatively, the imaging system may comprise a panchromatic imager.

In various embodiments, the optical arrangement may also comprise one or more polarizers. For example, such polarizers may provide for parallel-polarization imaging by the imaging system, may provide for cross-polarization imaging by the imaging system, or may provided for random polarization imaging by the imaging system.

BRIEF DESCRIPTION OF THE DRAWINGS

A further understanding of the nature and advantages of the present invention may be realized by reference to the remaining portions of the specification and the drawings wherein like reference labels are used through the several drawings to refer to similar components.

The patent or application file contains at least one drawing executed in color. Copies of this patent or patent application publication with color drawings will be provided by the Office upon request and payment of the necessary fee.

DETAILED DESCRIPTION OF THE INVENTION

1. Overview

Figure 1:
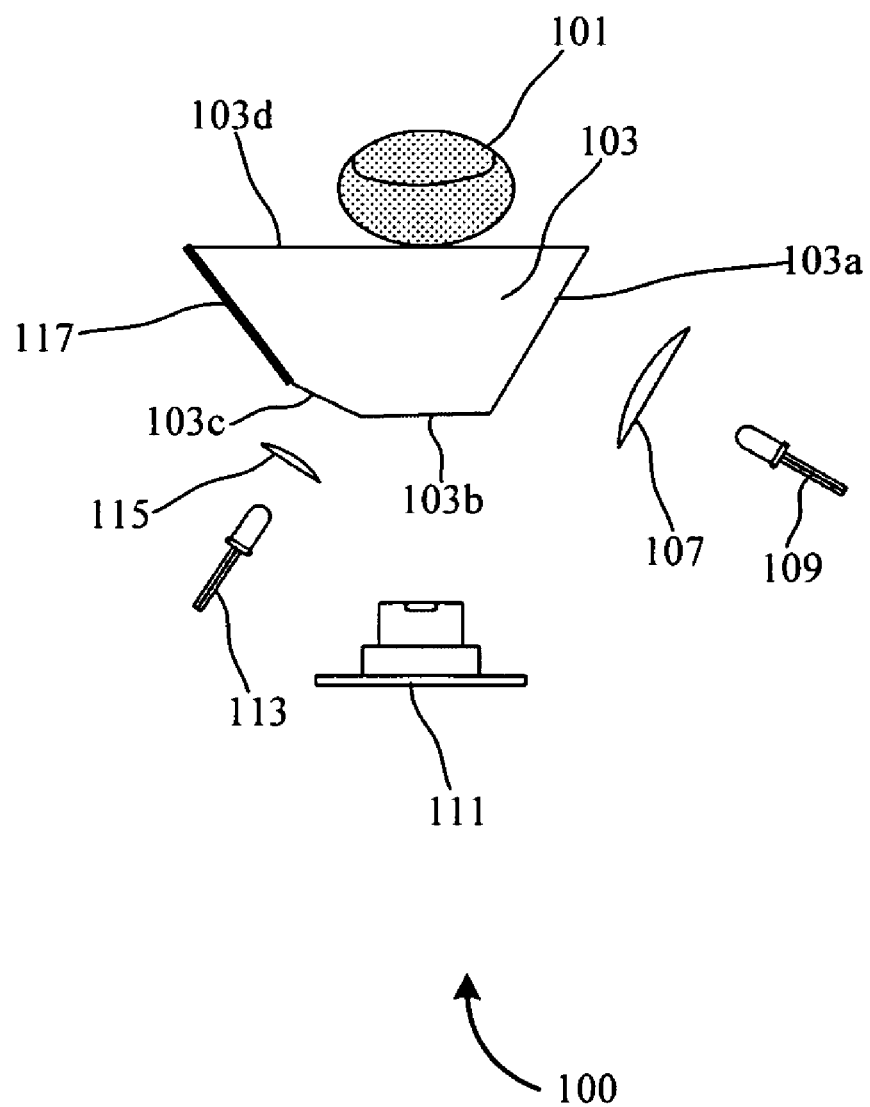
FIG. 1 illustrates a combined multispectral and TIR biometric imaging system according to a first embodiment of the invention.

Embodiments of the invention provide methods and systems that allow for the collection and processing of biometric measurements. These biometric measurements may provide strong assurance of a person's identity, as well as of the authenticity of the biometric sample being taken, and may be incorporated within a number of different types of devices, such as cellular telephones, personal digital assistants, laptop computers, and other portable electronic devices, as well as stand-alone devices for physical or logical access. The embodiments of the present invention may be used for fingerprint image acquisition for both civil and criminal identification. The common characteristic of the methods and systems of the present invention is the application of combined multispectral and TIR illumination sources with a single imaging system.

The sensors of the present invention provide for an information-rich dataset that results in increased security and usability relative to conventional sensors. The increased security derives from combining information from multiple images that represent distinct optical characteristics of the material being measured. These characteristics provide sufficient information to be able to distinguish between living human skin and various artificial materials and methods that might be used to attempt to spoof the sensor. As well, increased security is derived from the aspect of the present invention that provides a mechanism to perform measurements across a wide range of environmental and physiological effects. The robust and reliable sampling means that system security standards do not have to be relaxed to compensate for poor image quality.

Enhanced sensor usability is achieved by reducing the constraints on the individual for precise contact and positioning, as well as the requirement that the individual's skin has particular qualities. As well, the ability to extract subsurface biometric information from images collected under certain optical conditions provides a mechanism for performing biometric determinations even in those cases where the surface features are missing or damaged. In this way, using the multispectral measurements made in embodiments of the present invention in conjunction with TIR measurements together are advantageously robust to non-ideal skin qualities, such as dryness, excess wetness, lack of resilience, and/or worn features such as are typically associated with the elderly, those who perform significant manual labor, or those whose skin is exposed to chemicals, such as hairdressers or nurses.

The different optical conditions may include differences in polarization conditions, differences in illumination angle, differences in imaging angle and differences in illumination wavelength. TIR data is the result of images significantly affected by the presence and distribution of TIR phenomena at the interface between the sample and the platen regardless of whether it is bright field or dark field imaging conditions. These images are referred to herein as "TIR images." In some optical conditions, the resulting images are substantially unaffected by the presence or absence of TIR effects at the platen. These images are referred to herein as "multispectral images".

Skin sites applicable to the multispectral and TIR measurements described herein include all surfaces and all joints of the fingers and thumbs, the fingernails and nail beds, the palms, the backs of the hands, the wrists and forearms, the face, the eyes, the ears, and all other external surfaces of the body. While the discussion below sometimes makes specific reference to "fingers" in providing examples of specific embodiments, it should be understood that these embodiments are merely exemplary and that other embodiments may use skin sites at other body parts.

In some embodiments, a sensor provides a plurality of discrete wavelengths of light that penetrate the surface of the skin, and scatter within the skin and/or underlying tissue. As used herein, reference to "discrete wavelengths" is intended to refer to sets of wavelengths or wavelength bands that are treated as single binned units—for each binned unit, information is extracted only from the binned unit as a whole, and not from individual wavelength subsets of the binned unit. In some cases, the binned units may be discontinuous so that when a plurality of discrete wavelengths are provided, some wavelength between any pair of the wavelengths or wavelength bands is not provided, but this is not required. In some instances, the wavelengths are within the ultraviolet—visible—near-infrared wavelength range.

A portion of the light scattered by the skin and/or underlying tissue exits the skin and is used to form an image of the structure of the tissue at or below the surface of the skin. In some embodiments, such an image may include a fingerprint image, where the term "fingerprint" is used broadly herein to refer to any representation of any skin site with dermatoglyphic features.

TIR-based fingerprinting relies on a number of assumptions and/or conditions: that the skin is in good optical contact with the sensor; that the skin is properly moistened in order that the index of refraction be large enough to cause differences at points of contact; that surface features are present on the finger; and that no moisture or other contaminants are on the surface of the sensor. TIR gives high-quality, high-contrast images when these assumptions and conditions are met, but in some situations may not provide high-quality images. Combining TIR imaging with multispectral imaging provides a mechanism for collecting fingerprint images under a wide range of environmental, physiological, and sampling conditions.

Embodiments of the invention permit collection of both multispectral and TIR data, which may be combined to produce a better-quality conventional fingerprint. Multispectral images contain information complementary to some of the information provided by TIR. This includes liveness and spoof-detection capability, pattern-based or chromatic-textural information, and the ability to determine demographic information. Embodiments of the present invention make use of a single imaging array, leading to further reductions in cost, size, and weight of the overall system. The use of a single imaging system also avoids sensitivity that may exist to changes in alignment between multiple imaging systems that result from manufacturing variations or variations that occur after deployment in the field.

A detailed description is provided below of examples of combined multispectral and TIR systems that may accordingly be used in embodiments of the invention, but such a description is not intended to be limiting since other techniques may be used in alternative embodiments.

2. First Embodiment

FIG. 1 illustrates a first embodiment of the invention. A finger 101 is placed on a platen 103 having a plurality of facets. One facet of the platen 103 is optically blackened 117. There are two illumination systems: (1) a TIR illumination system that comprises a light source 109 and optional optics 107; and (2) a multispectral illumination system that comprises a light source 113 and optional optics 115. While the optics 107 and 115 are each shown in the form of a single lens, this is merely for illustrative purposes; more generally, the optics 107 and 115 may comprise an arrangement of lenses, mirrors, and other optical elements arranged to direct light from the sources 109 and 113 as desired. Similarly, the illustration of the light sources 109 and 113 as individual LEDs is also illustrative; a variety of other illumination sources may be used. This includes arrays of substantially monochromatic devices like LEDs, laser diodes, or the like, or broadband sources like incandescent sources and the like. A single imaging system is provided and comprises a digital imager and optics 111.

Figure 7:
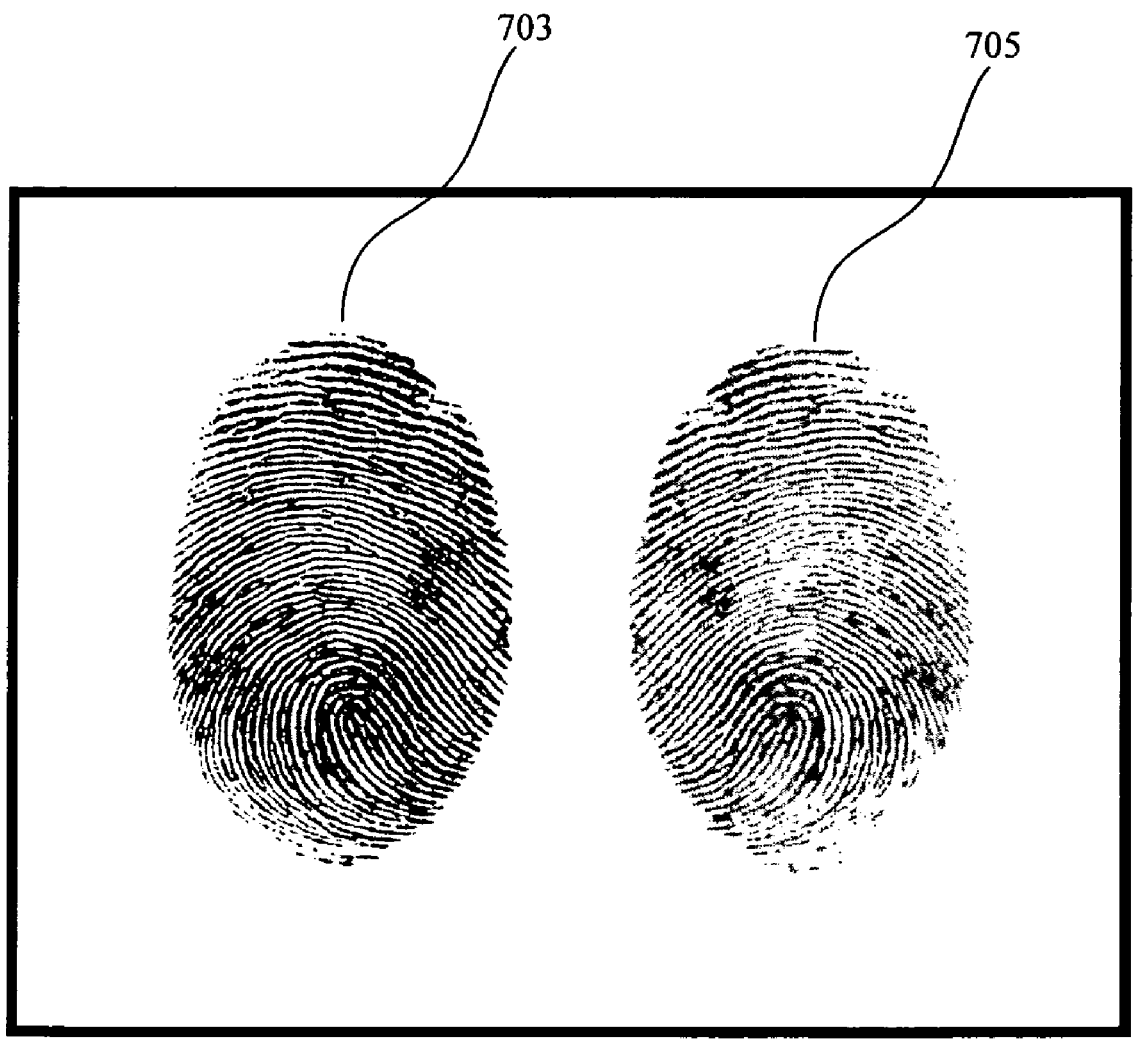
FIG. 7 depicts an image collected with the embodiment of FIG. 4.

The operating sequence may comprise illuminating the multispectral and TIR illumination sources and collecting images from both sources at different imaging locations on the imaging system. FIG. 7 shows an image of a multispectral and a TIR fingerprint, side by side. Alternatively, the operational sequence may comprise illuminating the multispectral illumination source, collecting an image, extinguishing the multispectral light, illuminating the TIR illumination source, collecting another image, and processing the images. An additional step in both operational sequences may include imaging when both illumination sources are not illuminated. A dark image may be useful in implementing corrections to compensate for ambient lighting effects, with each of the multispectral images and TIR images being processed to subtract the dark image.

Figure 2:
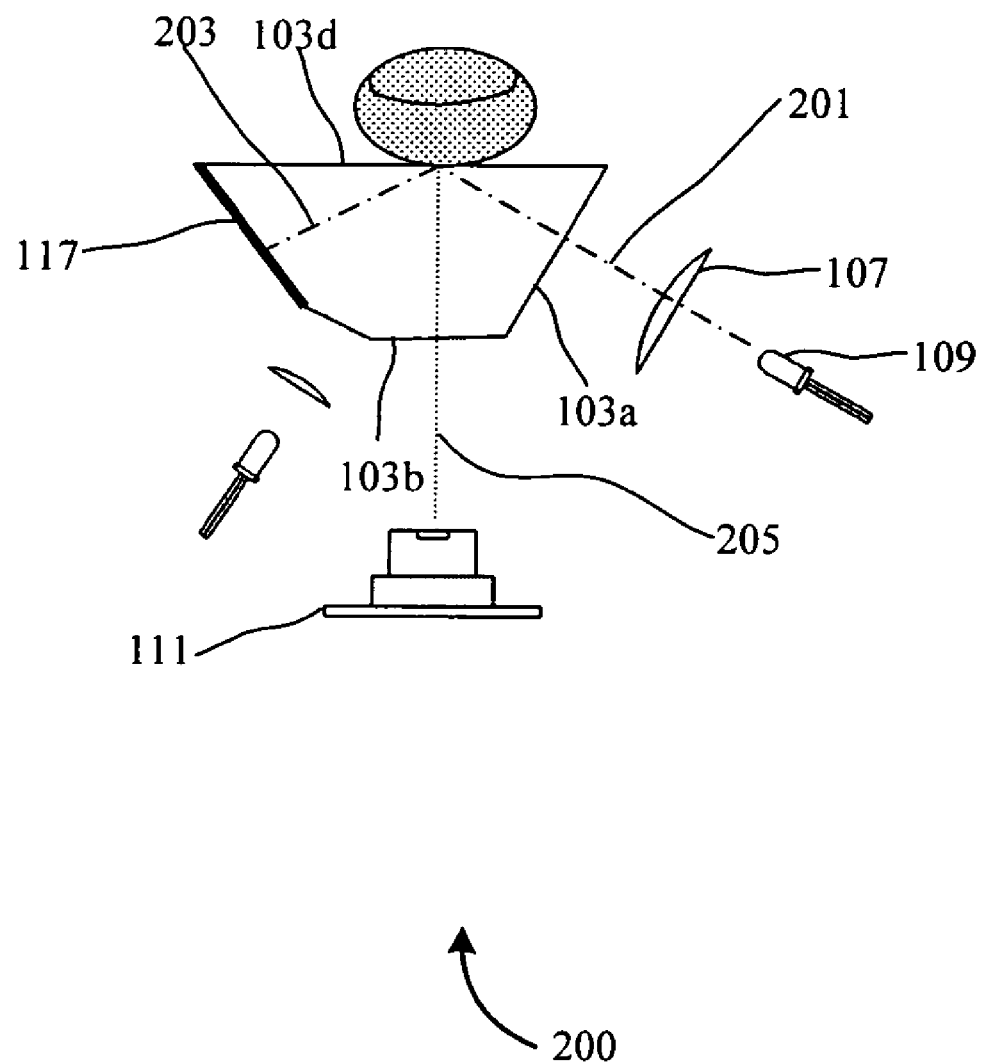
FIG. 2 illustrates the illumination path of the TIR illumination source of the embodiment of FIG. 1.

FIG. 2 illustrates the TIR imaging mode of the embodiment of FIG. 1. Light from source 109 follows path 201 through optics 107 and facet 103*a*. In the absence of a finger or other contact with appropriate material, the light undergoes TIR reflection at 103*d*. The reflected light follows path 203, strikes the optically black surface 117, and is absorbed. Accordingly, the imager does not record an image. The angle of the illumination path 201 (and as affected by facet 103*a*) relative to facet 103*d* must be at an angle greater than the critical angle to provide TIR imaging.

The imaging system 111 views the facet 103*d* through facet 103*b* along illumination path 205. In the absence of a finger, the image is dark. But when a finger is placed in contact with facet 103*d*, the points of contact break TIR and allow scattered light to be seen by the imaging system 111. This configuration results in a true TIR image collected in a dark-field arrangement.

Total internal reflection occurs when the angle of incidence between the surface target of the platen and the illumination path is greater than the critical angle. As known in the art, refraction of light will generally occur at an interface between two materials with different indices of refraction. The angle of refraction will be different for different illumination angles and is governed by Snell's law:

$$n_1 \sin \Theta_1 = n_2 \sin \Theta_2.$$

where $n_1$ can be the refractive index in air, $n_2$ can be the refractive index in the platen, and the angles, $\theta_1$ and $\theta_2$, are measured in the respective media from the normal to the interface. Because, the refractive index of air ($n_{air}$) is less than refractive index of glass ($n_{glass}$), the critical angle of the interface, $\theta_c$, is given by:

$$\Theta_C = \sin^{-1}\left(\frac{n_{air}}{n_{glass}}\right).$$

For example, in the case where $n_{air}$ is approximately equal to 1.0 and $n_{glass}$ is approximately equal to 1.5, corresponding to a typical index for glass, the critical angle is approximately 41.8 degrees. In a case such as this, the incident angle of illumination path 205 must be greater than 41.8 degrees. Furthermore, in order for TIR frustration to occur at the interface when a finger is placed on the platen, the incident angle must be less than the critical angle defined by the interface between the platen and the finger skin. For skin with an index of refraction of 1.4 this secondary critical angle is approximately 70.0 degrees. Accordingly, in this example, the incident angle of the illumination path must be greater than 41.8 degrees but less than 70.0 degrees.

Figure 3:
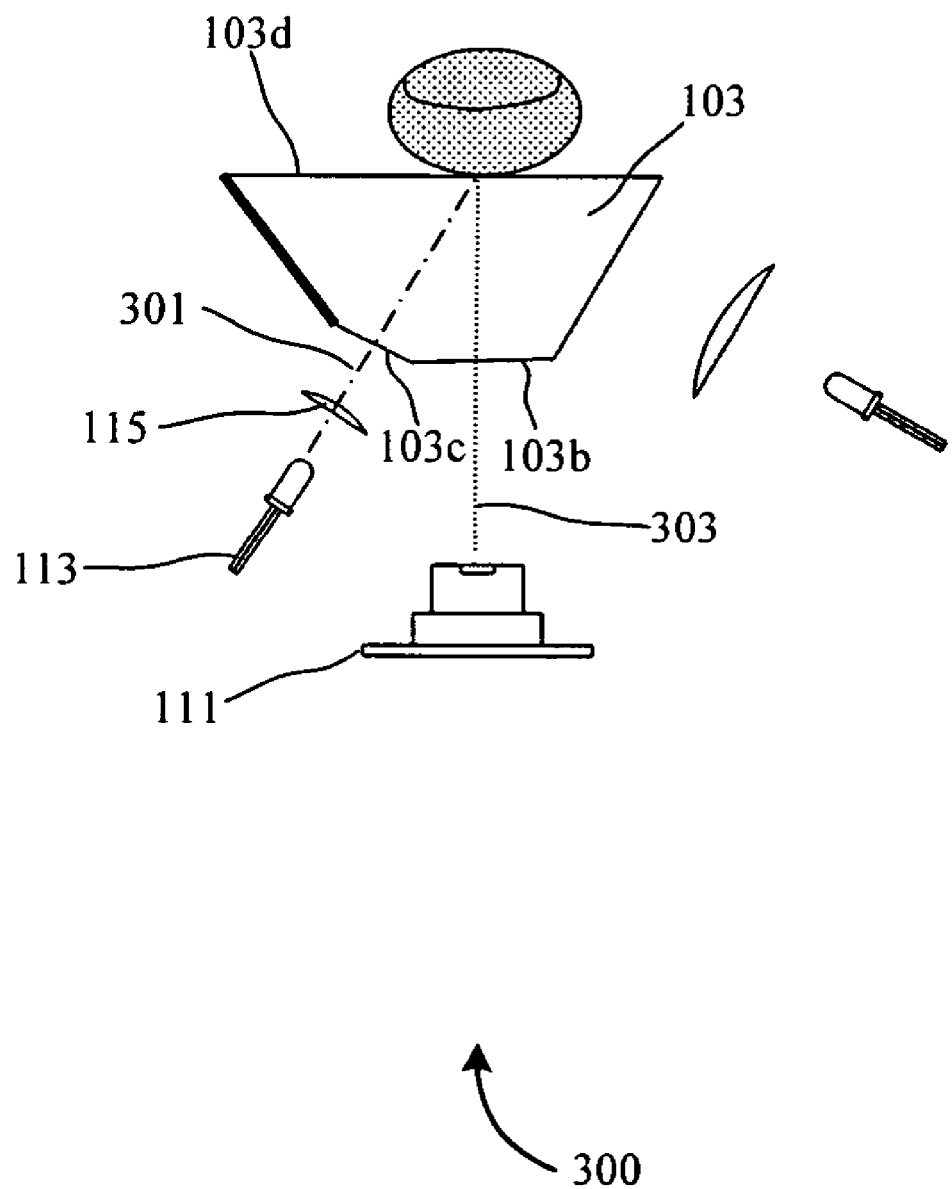
FIG. 3 illustrates the illumination path of the multispectral illumination source of the embodiment of FIG. 1.

FIG. 3 illustrates the multispectral imaging mode of the embodiment of FIG. 1. Light from source 113 follows path 301 through optics 115 and facets 103*c*. The imaging system 111 views the facet 103*d* through facet 103*b* along path 303. The angle of the lighting path 301 (and as affected by facet 103*c*) relative to facet 103*d* must be at an angle less than the critical angle. As discussed above, in the case of air and typical glass, the angle of incident must be less than 41.8 degrees. Because the incident angle is less than the critical angle, the illumination light from the illumination source 113 passes through the top facet of the platen 103*d* and illuminates all portions of a finger when present on or above the platen 103. A portion of the light illuminating the finger will be reflected from the skin surface while a second portion of the light will pass into the skin and undergo optical effects such as scattering and absorption. Generally, a portion of the light that enters the finger skin will scatter back out of the skin and pass back into the platen 103. The light scattered back into the platen 103 is then follow path 303 and be imaged by the imaging system 111

There are a number of features that may be noted with respect to the embodiments of FIGS. 1-3. For example, the imager may be panchromatic or color in different embodiments. As previously noted, the illumination may be monochromatic or wide band. In embodiments that use wide-band illumination, the imaging system 111 may comprise an imager with a color filter array, such as in the form of a color imager. The imaging system 111 may comprise a digital imaging system having a digital array and detection optics adapted to focus the light reflected from the object onto the array. For example, the detection optics may comprise a lens, a mirror, a pinhole, a combination of such elements, or may use other optical elements known to those of skill in the art. The array may comprise a silicon imaging array, such as a CCD or CMOS array, an InGaAs array, or other detector arrays as known in the art. In some instances, the imaging system 111 may also comprise an optical filter. The optical filter may be a short-wavelength pass filter, which substantially blocks light of wavelengths longer than the illumination wavelength range. Such a configuration has been found by the inventors to provide advantageous performance in the presence of bright, broad-band ambient lighting, since wavelengths of light longer than approximately 580 nm may substantially traverse the finger. In bright sunlight, this long wavelength light may saturate the detector array preventing the acquisition of an image. Blocking such long-wavelength light with filter while passing all desired illumination wavelengths may thus be beneficial.

The imager 111 may take multiple images in sequence during an illumination session. For example, when the multispectral illumination source includes multiple sources of different wavelengths, polarization conditions, and/or angles, a first source may illuminate during which time the camera acquires and stores an image. The first source may then be extinguished and a second source is illuminated during which time a second image is acquired and stored. This sequence then continues for all sources and may further include a "dark" image that is collected with no sources illuminated. Also any or all of the image conditions may be repeated an arbitrary number of times during an illumination session. The resulting images may be combined in various ways for subsequent processing. For example, difference images may be generated between each of the illuminated states and the dark image. The difference between these two types of images allows the effect of illumination to be separated from background illumination. The difference images may then be used for further processing according to other aspects of the invention.

In some instances the filter may be a color filter array, which may furthermore be incorporated as part of the digital array. The color filter array may comprise a red-green-blue filter array in the well-known Bayer pattern. In some instances, the filter elements may function to transmit wavelengths that differ from the standard red-green-blue wavelengths, may include additional wavelengths, and/or may be arranged in a pattern that differs from the Bayer pattern. In instances where such a color filter array is included, the illumination source(s) may be white-light or broadband source(s). Alternatively, the illumination source(s) 109, 113 may comprise a plurality of narrowband sources, such as LEDs, with central wavelengths that are within the pass bands of filter elements comprised by the color filter array. In some embodiments, the illumination light is provided within a wavelength range of approximately 400-1000 nm. In other embodiments, wavelengths within the visible range of the spectrum, i.e. in the range of about 400-700 nm, are used. In some cases, a plurality of substantially discrete wavelengths are used, such as in an embodiment where three illumination wavelengths correspond to red, green, and blue colors at about 600, 540, and 450 nm respectively. Moreover, in other embodiments the images may be recorded side by side by the imager 111 either simultaneously or one after the other.

There may also be a plurality of illumination sources provided for each of the multispectral and TIR imaging. In some cases, each of the plurality of sources may be nominally identical and arranged to provide for substantially uniform illumination and/or illumination of a desired intensity. In other cases, the plurality of sources may be narrow-band sources of different wavelengths chosen so that when they are illuminated together they comprise a broadband source of illumination that can be used with a color imager. In some embodiments, polarizers may be included in the illumination and/or detection subsystems to provide for parallel-polarization imaging, crossed-polarization imaging, or random polarization imaging.

3. Second Embodiment

Figure 4:
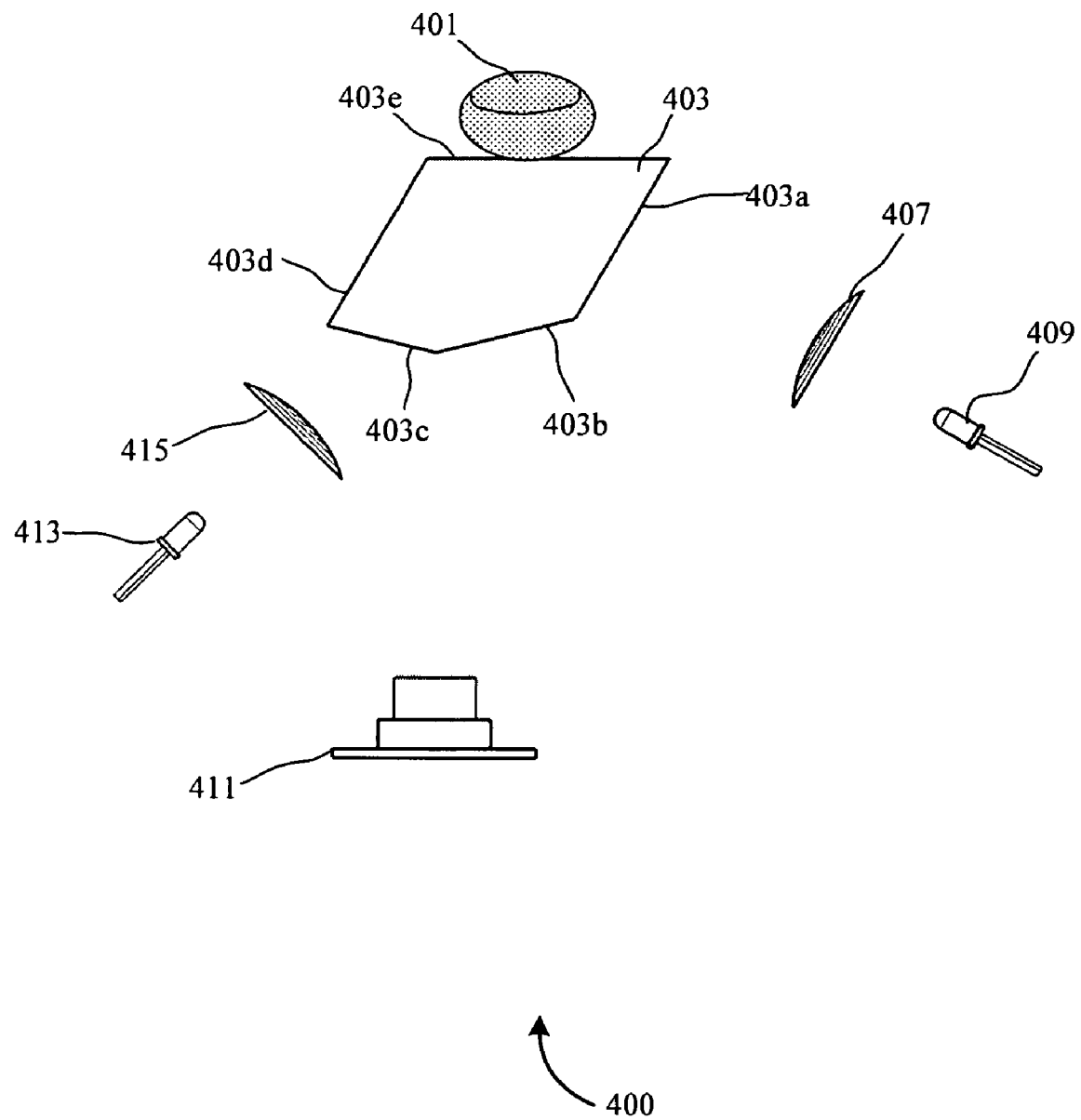
FIG. 4 illustrates a combined multispectral and TIR biometric imaging system according to a second embodiment of the invention.

A second embodiment of the invention is illustrated with FIG. 4. In this embodiment, a finger 401 is placed on a platen 403 having multiple facets. There are again two illumination systems, a TIR illumination system that comprises a light source 409 and optics 407 and a multispectral illumination system that comprises a light source 413 and optics 415. Again, the simplicity of the light sources 409 and 413 and of the optics 407 and 415 are merely illustrative; more complex optical arrangements and the use of different illumination sources than those illustrated are intended to be within the scope of the invention. There is a single imaging system that includes a digital imager and optics, and denoted collectively by reference number 411. In this embodiment, the operation sequence comprises illuminating both the multispectral and TIR illumination sources simultaneously. The facets 403b and 403c and the imager system 411 are arranged such that the multispectral and TIR images are located on different portions of the digital image. Similar to the embodiment of FIG. 1, it is possible in some instances to collect a dark image with no lights illuminated. This permits correction for ambient lighting effects by subtracting the dark image from each of the multispectral and TIR images.

Figure 5:
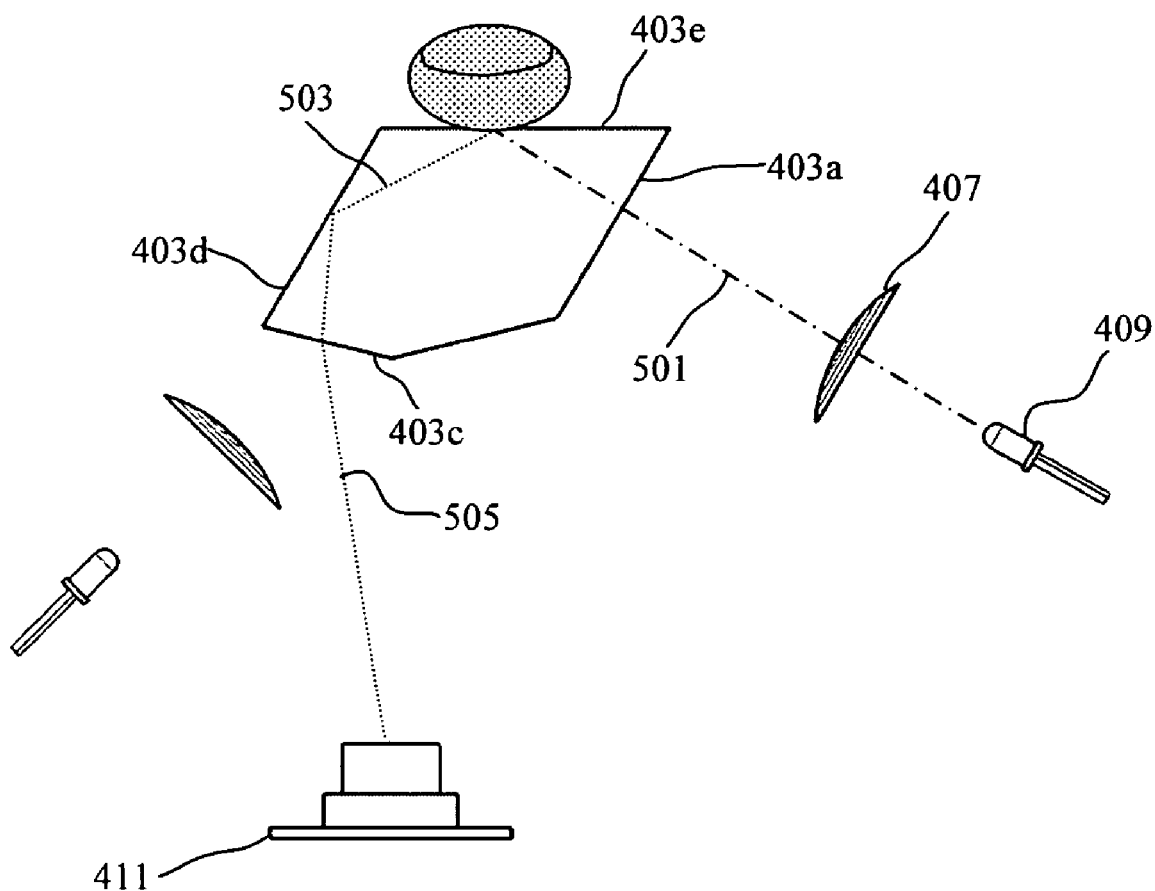
FIG. 5 illustrates the illumination path of the TIR illumination source of the embodiment of FIG. 4.

FIG. 5 illustrates the TIR imaging mode of the embodiment of FIG. 4. Light from source 409 follows illumination path 501 through optics 407 and facet 403a. The illumination path is incident on facet 403e at an angle greater than the critical angle. In the absence of a finger or other contact with appropriate material, the light undergoes TIR reflection at facet 403e. The reflected light follows path 503, undergoing TIR reflection at facet 403d, passes through facet 403c and is collected after following path 505 by the imaging system 411. The angles of the light in paths 501 and 503 as it encounters facets 403e and 403d respectively must be greater than the critical angle to ensure TIR reflections at these surfaces. The imaging system 111 views the facet 403e through facet 403c along path 503. In the absence of a finger 401, the image is bright. But when a finger is placed in contact with facet 103d, the points of contact break TIR and absorb light that would otherwise have undergone TIR reflection, making these points relatively dark as seen by the imaging system 411.

Figure 6:
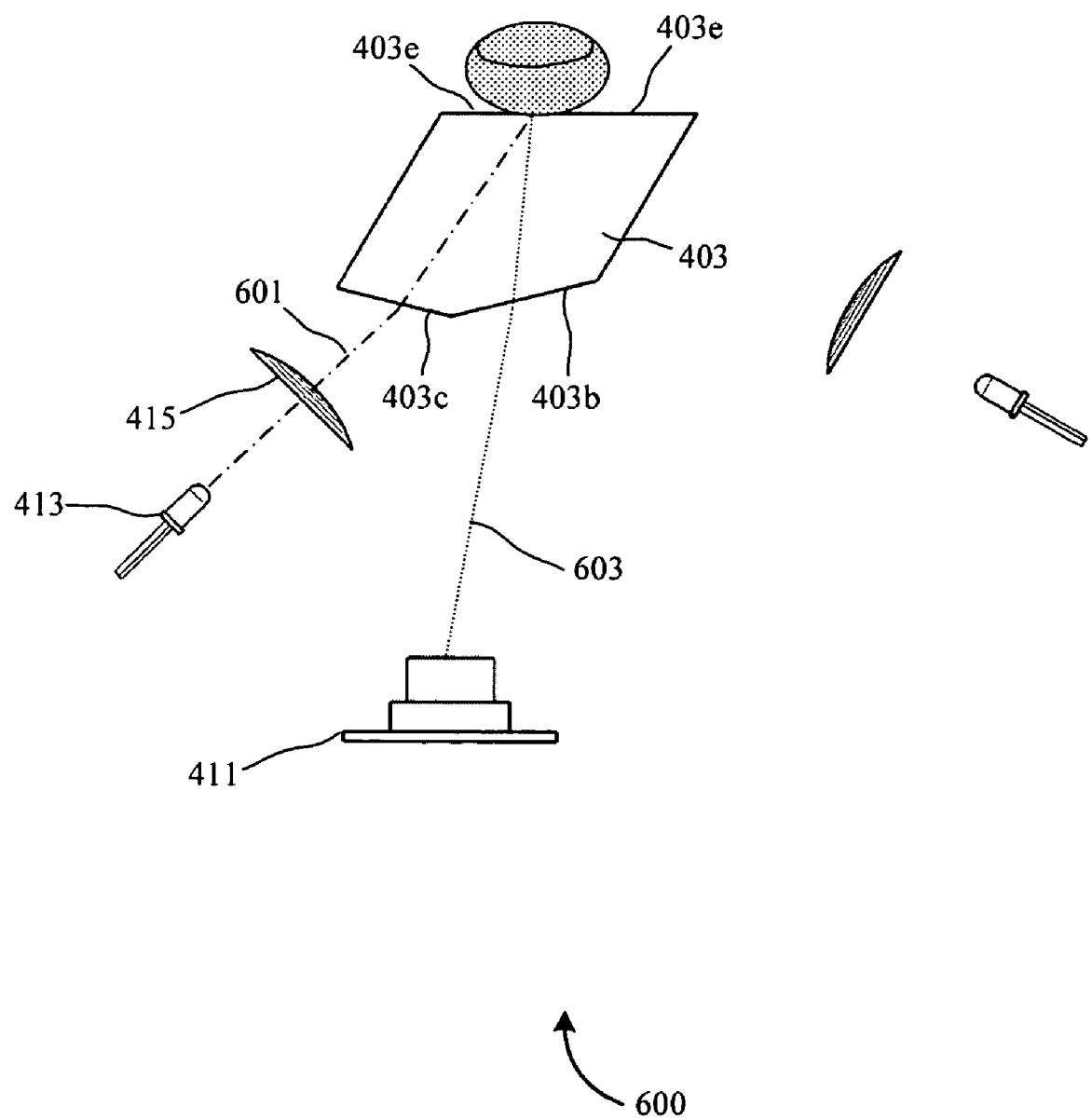
FIG. 6 illustrates the illumination path of the TIR illumination source of the embodiment of FIG. 4.

FIG. 6 illustrates the multispectral imaging mode of the embodiment of FIG. 4. Light from source 413 follows path 601 through optics 415 and facet 403c. The angle of the lighting path 601 (and as affected by facet 403c) relative to facet 403e must be at an angle less than the critical angle. The imaging system 411 views the facet 403e through facet 403b along path 603. In the absence of a finger, the image is dark. But when a finger is placed in contact with facet 403e, some of the light from source 413 is reflected by the surface of the skin in the direction of path 603 and seen by imager 411. In addition, some of the light may be diffusely reflected by subsurface portions of the skin and also measured by imager 411.

The platen 403 as shown in FIGS. 4-6 has facets 403b and 403c. As shown and discussed in FIGS. 5-6, light passes through each of these facets after reflection and scattering at surface 403e prior to imaging at the imager 411. These facets 403b and 403c are non parallel planes.

FIG. 7 depicts an example of an image 700 collected by imaging system 411 when a finger 101 is touching facet 403e and both the TIR light source 409 and multispectral light source 413 are illuminated. Image 700 shows a TIR image 705 of a finger and a multispectral image 703 of the same finger. These images may be subject to various process, such as, for example, an assessment of the multispectral image 703 to ensure that the finger is not a spoof sample or otherwise altered. The multispectral image 703 and TIR image 705 may be combined to provide a single synthetic representation of the fingerprint that corresponds to a monochromatic representation of the fingerprint pattern.

Similar to the embodiment of FIGS. 1-3, there are a number of variations on the embodiment of FIGS. 4-6 that are also within the intended scope of the invention. For example, the imager can be panchromatic or color and the illumination may be substantially monochromatic or wide band. In embodiments where wide-band illumination is used, the imager may sometimes comprises a color filter array to provide a color imager. The illumination sources 409 and 413 may each comprises a plurality of illumination sources that are nominally identical and arranged to provided for substantially uniform illumination and/or illumination of a desired intensity. In certain instances, the plurality of sources comprises narrow-band sources of different wavelengths that provide a broad-band source of illumination when illumination together for use with a color imager.

The illumination sources may also be moveable. The illumination sources may move in order to illuminate the surface target from different angles. The illumination sources may be turned off in between positions or may remain on during movements between positions. Furthermore, the imager may record images while the illumination sources are moving, it may wait until the illumination sources are illuminating the surface target from a specific location or when the illumination sources are turned on.

The specific characteristics of the optical components shown in FIGS. 1-6 may be implemented to meet different form-factor constraints. For example, in an embodiment where skin site or surface target is implemented in the top of a gear shift as part of a system to verify the identity of a driver of a vehicle, the illumination sources and imaging device might not fit within the gear-shift handle as constructed. In such an embodiment, an optical relay system may be implemented. For example, relay optics that comprise individual lenses similar to those in a bore scope may be used, or alternatively optical fibers such as used in orthoscopes may be used. In other cases, the optical paths of the illumination sources and/or the imaging subsystem may be folded through the use of mirrors to reduce the overall size. Still other techniques for implementing an optical relay system and/or folding the optical systems will be evident to those of skill in the art. In this way, components of the sensor may be located remotely from the sampling surface or be configured to fit other form-factor constraints.

Polarizers may be also be inserted in the multispectral illumination and/or detection systems to provide for parallel-polarization imaging, cross-polarization imaging, or random polarization imaging in different embodiments. Polarizers may be linear, circular, elliptical, or some combination of the these. In such embodiments, the illumination sources may be broadband or narrowband. If narrowband, the sources may all be the same wavelength or may be substantially different wavelengths. The polarizers may also provide a "crossed polarization" arrangement or a "parallel polarization" arrangement on some or all of the illumination sources. In multiple illumination source systems, one or more of the illumination subsystems may have the polarizer omitted, producing randomly polarized illumination light.

In the case that one of the illumination sources provides a crossed polarization arrangement, the polarizer may be disposed and oriented to provide illumination light that is polarized orthogonally to the polarization at the imaging system. Such orthogonality has utility in ensuring that detected light has undergone multiple scatter events, such as at the skin site, since other light will be blocked. This characteristic of crossed polarizers is particularly pronounced in the case where the illumination subsystem is oriented at an angle less than the critical angle. In this case, in the absence of crossed polarizers, light may be detected from surface reflections from the skin, shallow scatter events, and deep scatter events. When crossed polarizers are used, surface and shallow-scattering phenomena are significantly attenuated. Conversely, parallel polarizer may be advantageously employed to accentuate surface features and shallow scattering effects. Random polarization can also be employed advantageously, particularly in conjunction with at least one other polarization state.

In the case of linear polarizers, a crossed polarization arrangement may be provided by having illumination polarizers oriented so that their axes are separated by approximately 90° from the axis of a detection polarizer. In alternative embodiments where the polarizers are circular polarizers, the orthogonality of the crossed polarization arrangement may be achieved by having circular polarizers of opposite sense (i.e. right hand and left hand). Further, in the case of linear polarizers, a parallel polarization arrangement may be provided by having illumination polarizers oriented so that their axes are approximately parallel to the axis of the detection polarizer. In alternative embodiments where the polarizers are circular polarizers, parallel polarization may be achieved by using the same sense of circular polarization Due to the effect of the polarizers, multiple different optical conditions can be achieved by changing the polarization state of the system, even when only a single illumination wavelength is being used. Of course, multispectral conditions may also comprise the use of different illumination wavelengths, different illumination angles, and different imaging angles, among other combination of different optical conditions.

Further utility is derived from the observation that the cross polarization arrangement greatly reduces the visibility of latent prints left on the platen by previous users, thus providing improved image quality and reducing the likelihood of spoofing by "reactivating" the latent prints. The utility of the arrangement also extends to conventional optical fingerprint readers. In particular, dark-field optical fingerprint systems are well-suited for the additional of polarizing elements in such an arrangement.

More generally, effects such as latent prints may be identified and segmented from the resulting multispectral data based upon their unique optical characteristics. For example, the optical qualities of latent prints with respect to different polarization conditions differ from living human tissue. Similarly, the spectral characteristics of latent prints as a function of wavelength and illumination angle are also quite different from living human tissue. An analysis of the spectral properties of the multispectral data can thus provide a means to separate the real tissue image from artifacts due to latent prints through techniques such as spectral unmixing, as known in the art. Spectral analysis may also be used to perform image segmentation, defining and isolating the region of the image that contains tissue data from the image background. In a similar manner, the totality of information available in the multispectral dataset of the present invention is well suited to distinguishing between genuine human skin and various attempts to use artificial samples or other means to spoof the sensor. The composite optical characteristics of skin over multiple wavelengths, polarization conditions and illumination angles is distinct for human skin, and can be employed to distinguish between skin and many different classes of materials that might be used in an attempt to spoof the sensor.

Nonstationary variants of different embodiments of the invention may be produced by such mechanisms as having a moveable imager or a rotating optical element such that either the multispectral or TIR image may be acquired by the imaging system. Although such configurations have the advantage of permitting the use of a smaller imager, they also tend to have a longer collection time because of serial acquisition of the images and greater system complexity.

Figure 8:
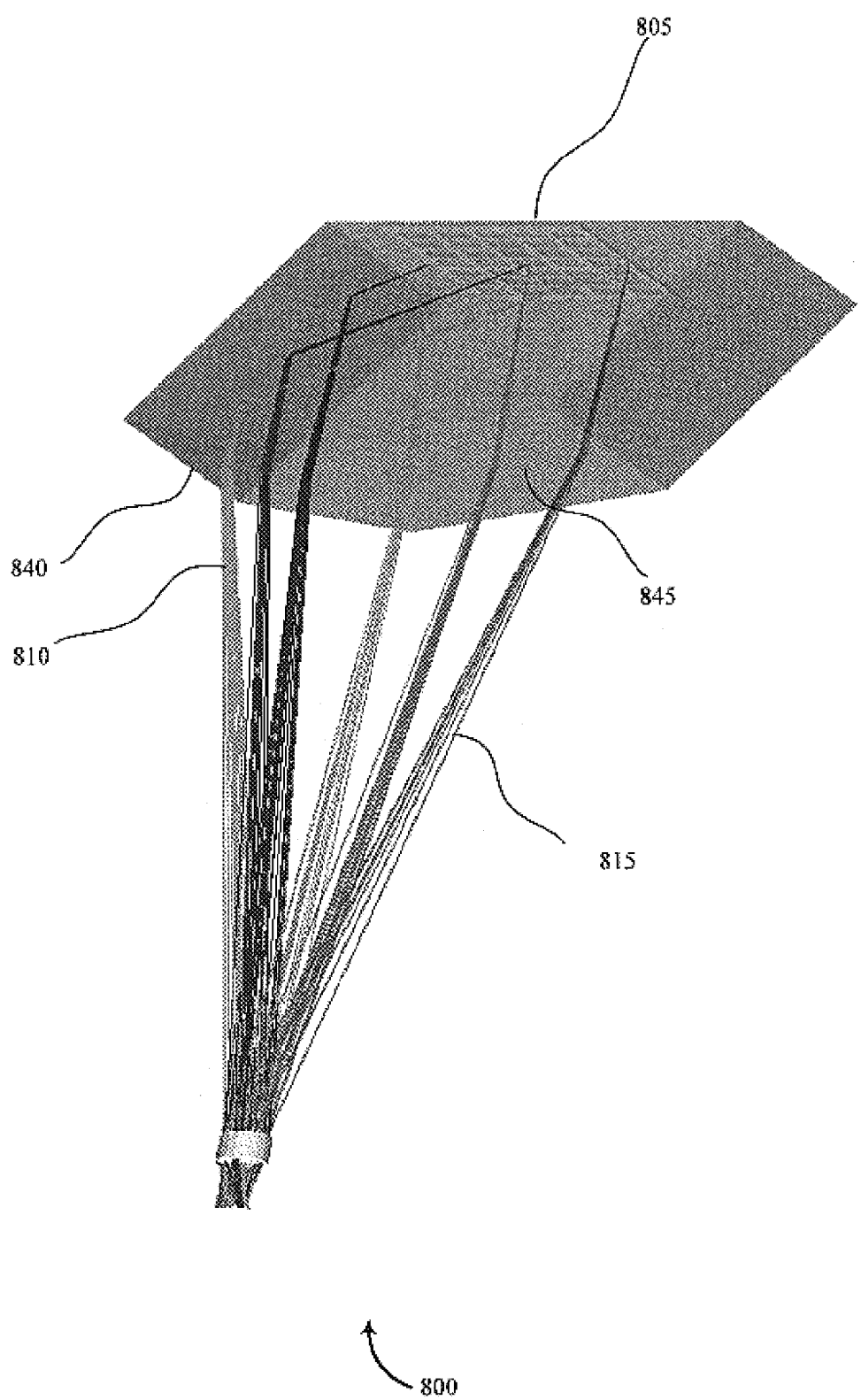
FIG. 8 show ray paths to illustrate the optical functions of a prism used in the embodiment of FIG. 4 (COLOR)
Figure 9:
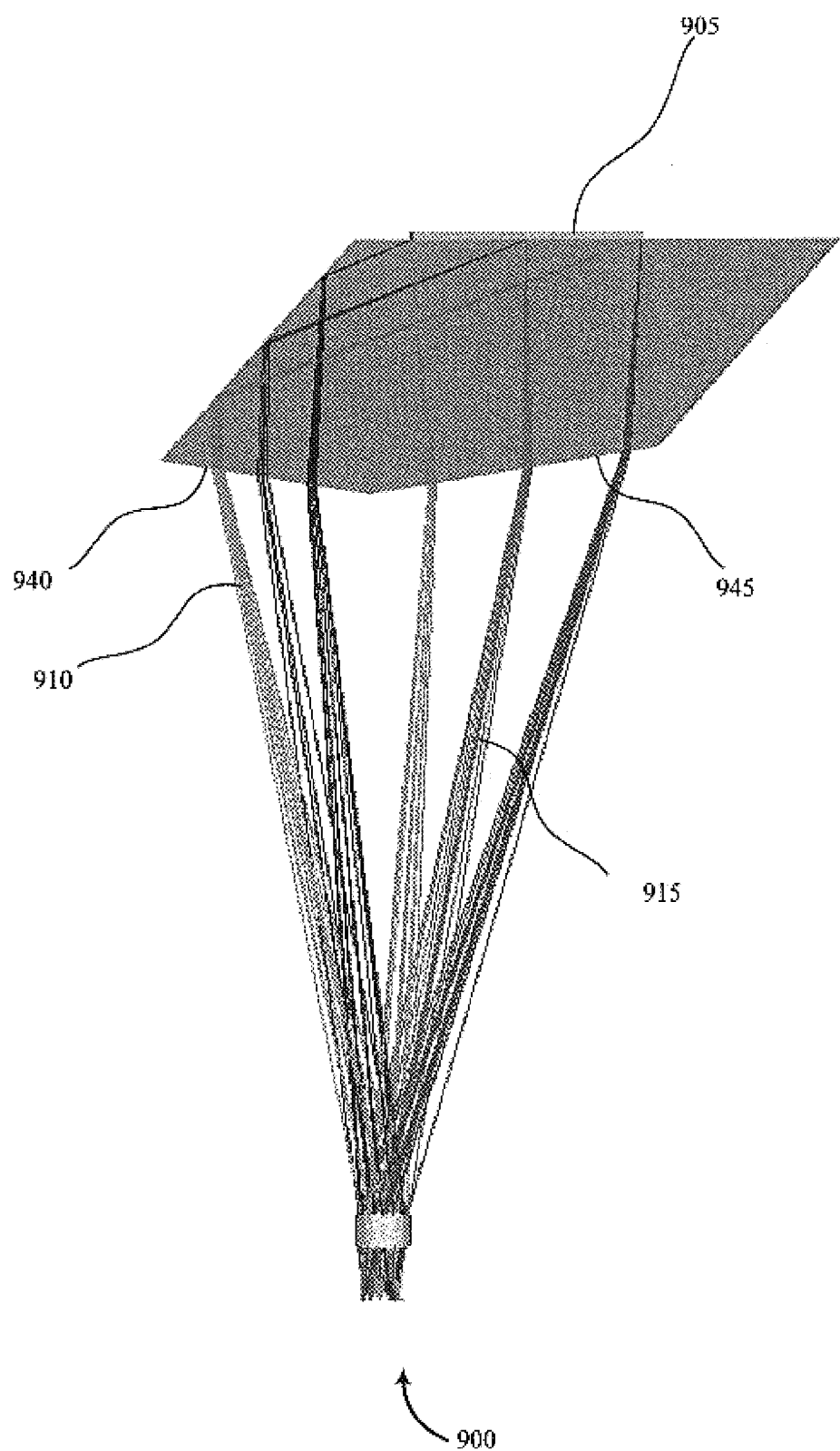
FIG. 9 show ray paths to illustrate the optical functions of a prism used in the embodiment of FIG. 4 (COLOR)

Some additional analysis of the optical system of the embodiment of FIGS. 1-6 is illustrated with FIGS. 8-11. The optical system may use a platen provided as a prism having a plurality of facets. This provides a single imaging lens and imager with dual images that reside at separate locations on the imager. In FIGS. 8 and 9, which show side and isometric views of the platen, the green grid represents a position where a finger would be placed. This position may be termed the surface target. The three ray paths shown on the right side of each drawing 815, 915 represent the multispectral imaging path and the three ray paths shown on the left side of each drawing 810, 910 represent the conventional TIR imaging path. Merely by way of example, the imaging lens in the system shown is provided as a cemented triplet achromat.

Other lens systems may be used to image the finger. FIG. 8 shows a platen with two non parallel imaging facets 840 and 845; FIG. 9 also shows a platen with two non parallel facets 940 and 945.

Figure 10A:
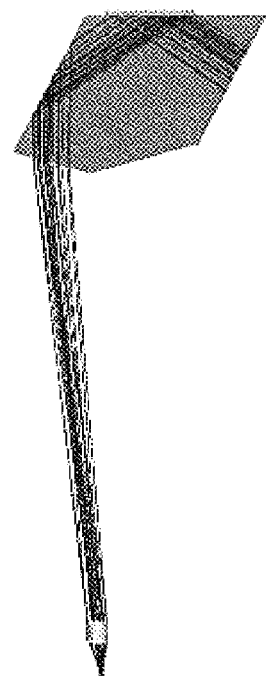
FIG. 10A shows ray paths to illustrate light travel in the embodiment of FIG. 4 to realize TIR illumination (COLOR)
Figure 10A:
Figure 10B:
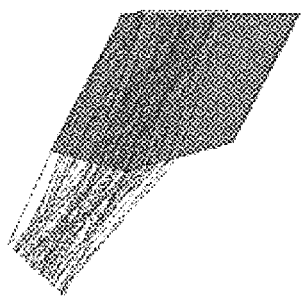
FIG. 10B shows ray paths to illustrate light travel in the embodiment of FIG. 4 to realize direct illumination (COLOR)
Figure 10B:

For instance, in certain variations, use of single imager is retained but separate imaging lens systems are provided for the conventional TIR and direct paths. FIG. 10A represents the path that the light would travel for the TIR case. The finger in contact with the prism platen would frustrate the TIR light and cause less light intensity on the imager at the corresponding locations of contact. FIG. 10B represents one possible scheme for multispectral illumination. Other schemes may use the TIR light source as a direct illuminator and a different source as a polarized direct illuminator. The direct illuminated light would scatter off the finger, and some of the scattered light would fall on the imaging lens and form an image of the finger on the imager.

Figure 11A:
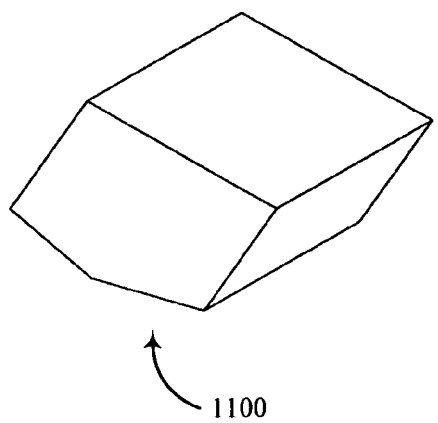
FIGS. 11A-11C show isometric, front, and side views of a prism that may be used in a particular embodiment.
Figure 11B:
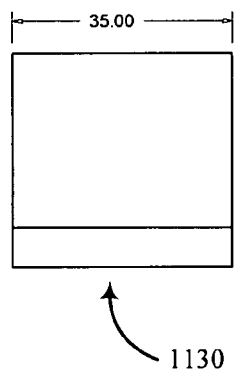
Figure 11C:
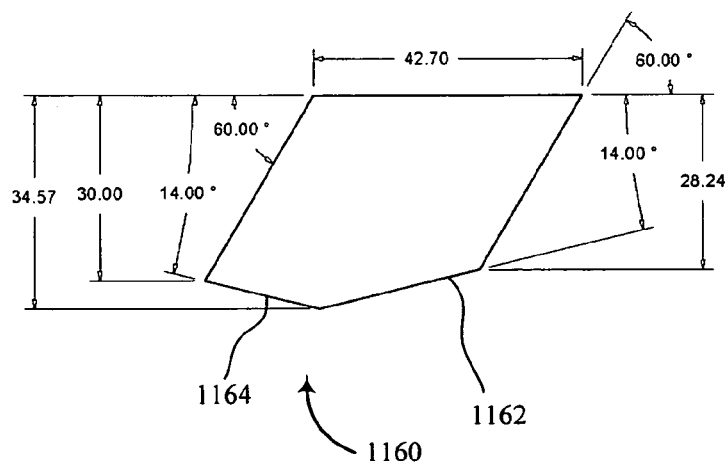

FIGS. 11A-11C show approximate prism 1100 dimensions for a specific embodiment, with dimensions shown in millimeters. The bottom angles may be chosen to make the light paths intersect at the imaging lens. These angles may also be chosen to make the light paths from the multispectral and TIR sources incident side by side on the imager. The angles may be designed make the optical path lengths closer for the conventional TIR and direct imaging paths. FIG. 11C shows non parallel imaging facets 1162 and 1164. Different prism shapes may be used in various different embodiments, including embodiments where two imaging lens arrangements are used.

Figure 12:
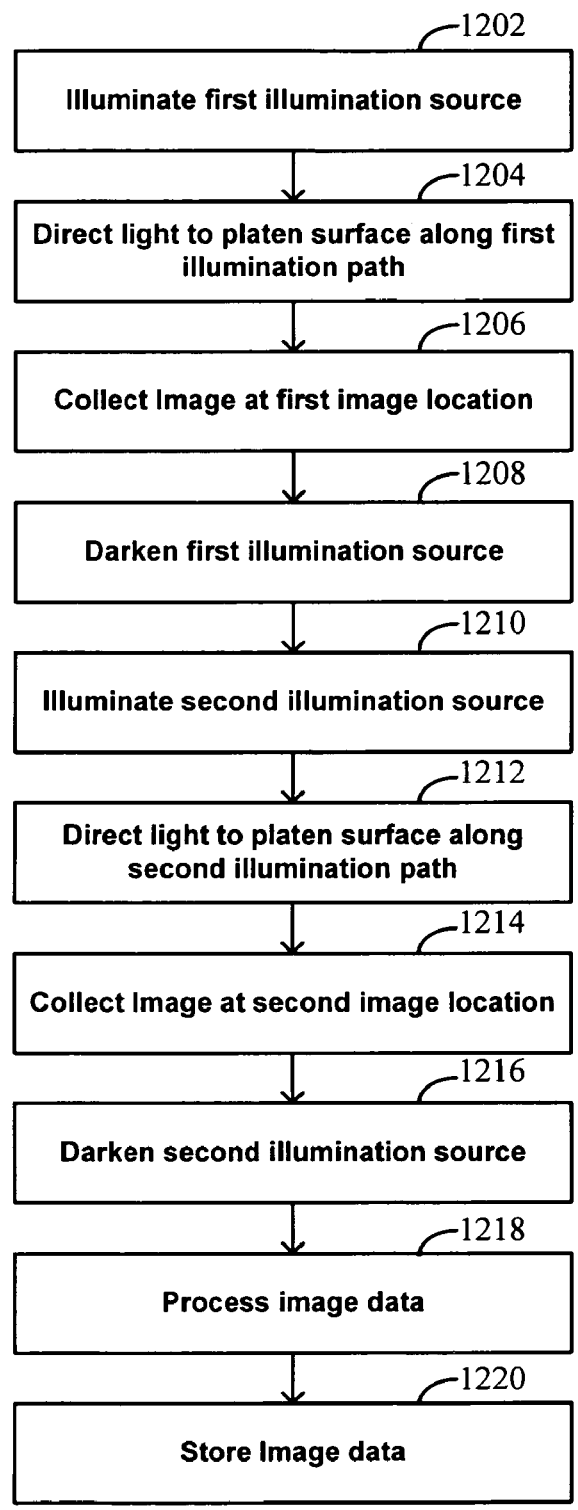
FIG. 12 shows an illumination and imaging sequence according to one embodiment of the invention.

The various embodiments of the invention described above may follow a variety of sequences as shown in FIGS. 12-15. These sequences are exemplary only. FIG. 12 shows one exemplary illumination and imaging sequence. The first illumination source is illuminated 1202, the light is directed towards the platen surface where a biometric feature may be placed 1204, an image is collected at a first location on the imager 1206, and the first illumination source is then darkened 1208. The second illumination source is then illuminated 1210, the light is directed towards the platen surface where a biometric feature may be placed 1212, an image is collected at a second location on the imager 1214, and then the second illumination source is darkened 1216. The images are then be processed 1218 and stored 1220. In other sequences the processing 1218 and/or storage 1220 steps may be eliminated as the application dictates.

Figure 13:
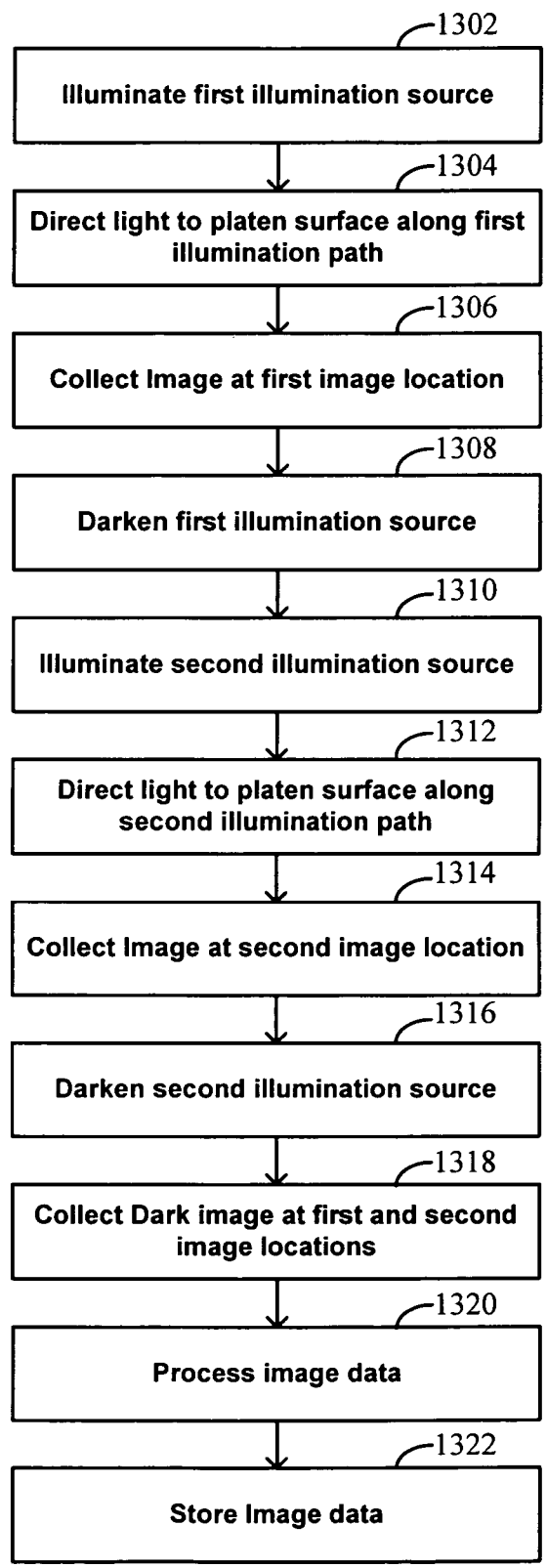
FIG. 13 shows another illumination and imaging sequence according to one embodiment of the invention.

In the sequences depicted in FIG. 13 steps 1302-1316 are identical to steps 1202-1216 in FIG. 12. In this sequence, however, the additional step of collecting a dark image at both imaging locations 1318 is included prior to the processing 1320 and storing steps 1322.

Figure 14:
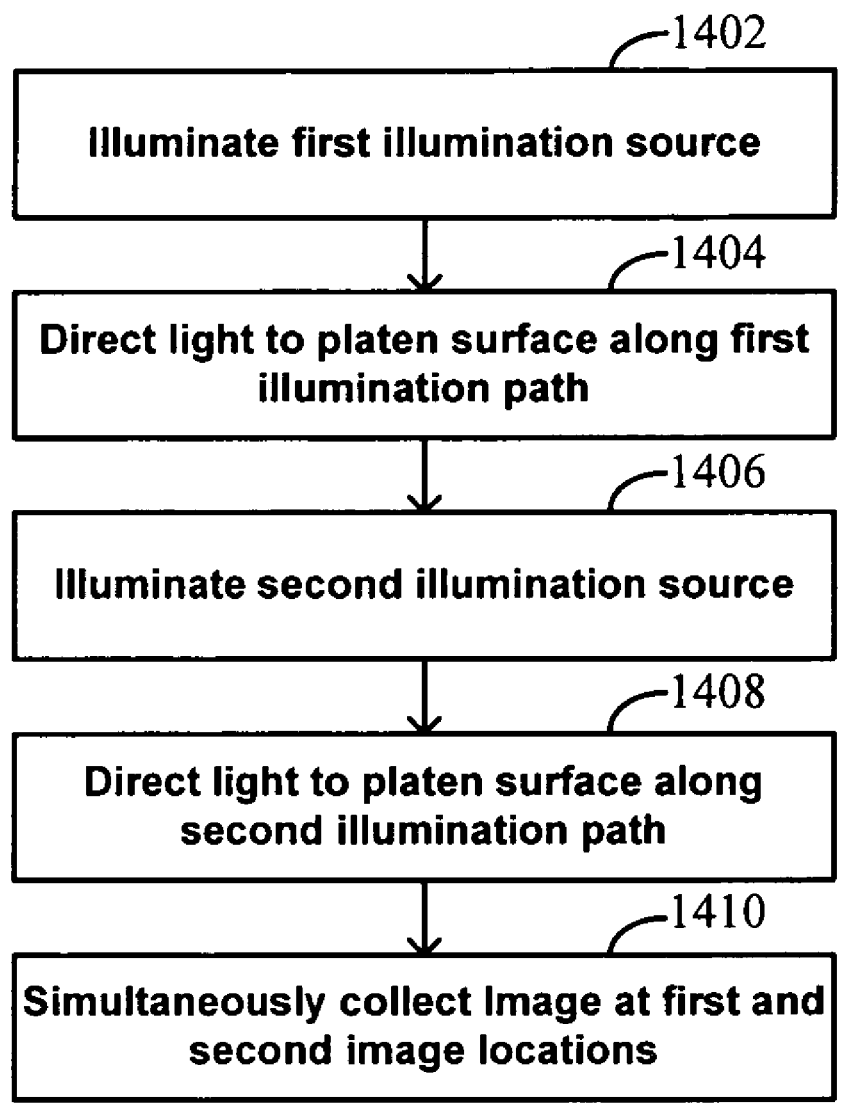
FIG. 14 shows another illumination and imaging sequence according to one embodiment of the invention.

The sequence shown in FIG. 14 illuminates the first illumination source 1402, directs light to the platen surface 1404, illuminates the second illumination source 1406, directs light to the platen surface 1408 and simultaneously collects images at the first and second image locations on the imager 1410. In this sequence, both illumination sources illuminate the imager at the same time but in different locations, whereas in the sequences shown in FIGS. 12 and 13, the imager collects images at each location only when the other sources is darkened.

Figure 15:
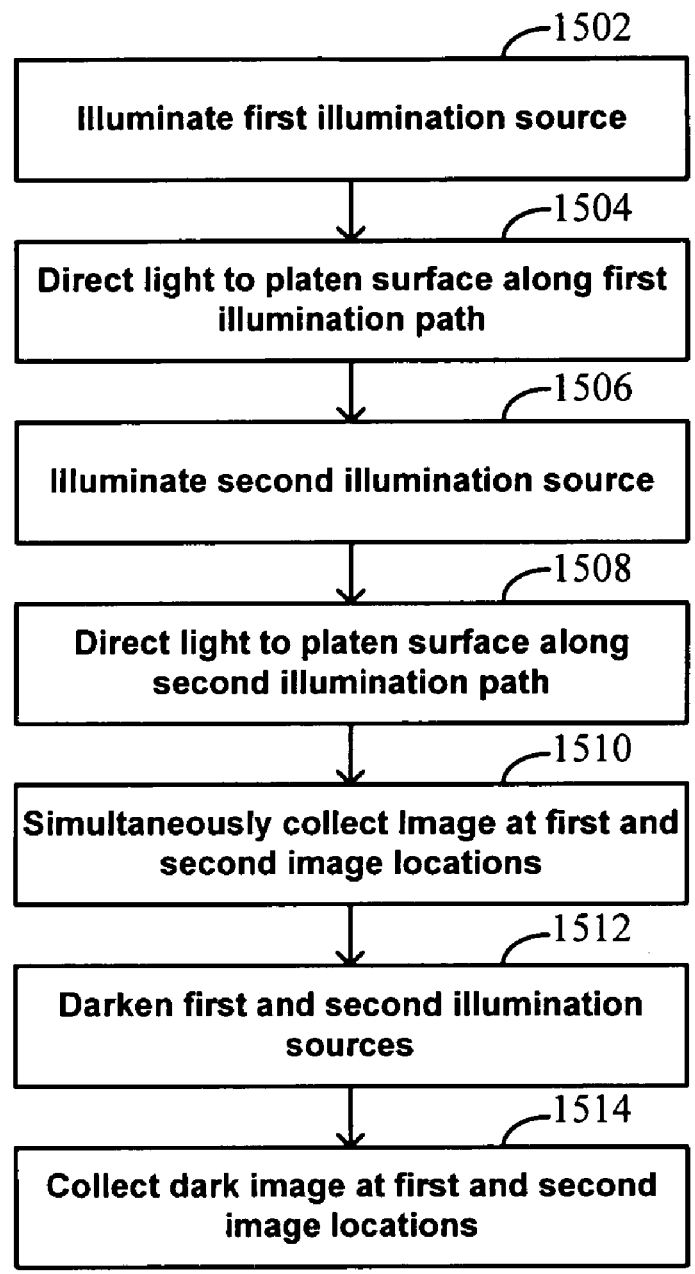
FIG. 15 shows yet another illumination and imaging sequence according to one embodiment of the invention.

As a final exemplary sequence, the sequence shown in FIG. 15 illuminates the first illumination source 1502, directs light to the platen surface 1504, illuminates the second illumination source 1506, directs light to the platen surface 1508 and simultaneously collects images at the first and second image locations on the imager 1510. After both images are collected by the imager, both sources are darkened 1512 and a dark image is collected at both the first and second image locations 1514.

Thus, having described several embodiments, it will be recognized by those of skill in the art that various modifications, alternative constructions, and equivalents may be used without departing from the spirit of the invention. Accordingly, the above description should not be taken as limiting the scope of the invention, which is defined in the following claims.

What is claimed is:

1. A combined multispectral and total-internal-reflectance biometric system, wherein the combined multispectral and total-internal-reflectance biometric system comprises:
    a platen having a plurality of facets, wherein at least one facet comprises a surface target facet;
    a first illumination source disposed to illuminate the surface target facet along a first illumination path that encounters the surface target facet at a first angle measured from a normal to the surface facet that is less than a critical angle, the critical angle defining a smallest angle measured from the normal at which light incident on the surface target facet substantially undergoes total-internal-reflectance;
    a second illumination source disposed to illuminate the surface target facet along a second illumination path that encounters the surface target facet at a second angle measured from the normal that is greater than the critical angle; and
    an imaging system comprising a first imaging location and a second imaging location;
    wherein:
        the imaging system is disposed to receive light propagated from the first illumination source after scattering at the surface target facet at the first imaging location; and
        the imaging system is disposed to receive light propagated from the second illumination source when total-internal-reflectance is substantially frustrated by the presence of the purported skin site on the surface target facet at the second imaging location.

2. The combined multispectral and total-internal-reflectance biometric imaging system recited in claim 1, further comprising a control mechanism configured to illuminate the first illumination source and the second illumination source simultaneously.

3. The combined multispectral and total-internal-reflectance biometric imaging system recited in claim 1, wherein at least one facet of the platen comprises an optical absorber.

4. The combined multispectral and total-internal-reflectance biometric imaging system recited in claim 3, wherein light propagated along the second illumination path substantially undergoes total-internal-reflectance at the surface target facet and encounters the optical absorber.

5. The combined multispectral and total-internal-reflectance biometric imaging system recited in claim 1, wherein the imager is configured to correct for ambient lighting effects by collecting a dark image at a time when the first illumination source and the second illumination source are not illuminated.

6. The combined multispectral and total-internal-reflectance biometric imaging system recited in claim 1, wherein the first illumination source comprises an illumination source selected from the group consisting of: a plurality of illumination sources, a broad-band illumination source, a plurality of illumination sources of different wavelengths, an illumination source that provides substantially uniform illumination intensity at the surface target, and an illumination source that provides substantially uniform illumination of the surface target.

7. The combined multispectral and total-internal-reflectance biometric imaging system recited in claim 1, wherein the second illumination source comprises an illumination source selected from the group consisting of: a plurality of illumination sources, a broad-band illumination source, a plurality of illumination sources of different wavelengths, an illumination source that provides substantially uniform illumination intensity at the surface target, and an illumination source that provides substantially uniform illumination of the surface target.

8. The combined multispectral and total-internal-reflectance biometric imaging system recited in claim 1, wherein the imager further comprises at least one first polarizer.

9. The combined multispectral and total-internal-reflectance biometric imaging system recited in claim 8, wherein the first illumination source comprises at least one second polarizer and the axis of the at least one second polarizer is substantially orthogonal to the axis of the at least one first polarizer.

10. The combined multispectral and total-internal-reflectance biometric imaging system recited in claim 8, wherein the first illumination source comprises at least one second polarizer and the axis of the at least one second polarizer is substantially parallel to the axis of the at least one first polarizer.

11. The combined multispectral and total-internal-reflectance biometric imaging system recited in claim 1, wherein light scattered from the surface target from the first illumination path exits the platen through a first exit facet, light scattered from the surface target from the second illumination path exits the platen through a second exit facet, and the first exit facet and the second exit facet are not parallel.

12. The combined multispectral and total-internal-reflectance biometric imaging system recited in claim 1, further comprising a mechanism adapted to move the first illumination source or the second illumination source into a plurality of positions.

13. A combined multispectral and total-internal-reflectance biometric imaging system comprising:
   a platen having a plurality of facets, at least one of the facets comprising a surface target facet;
   an illumination source;
   an optical arrangement disposed to illuminate the purported skin site with light from the illumination source along a plurality of distinct illumination paths, wherein a first illumination path encounters the surface target facet at a first angle measured from a normal to the surface target facet and is less than a critical angle, and a second illumination path encounters the surface target facet at a second angle measured from the normal to the surface target facet and is greater than the critical angle, the critical angle defining a smallest angle measured from the normal at which light incident on the surface target facet substantially undergoes total-internal-reflectance; and
   an imaging system disposed to receive light from the surface target facet and comprising a first imaging location and a second imaging location;
   wherein:
      light propagated from the illumination source along the first illumination path is received by the imaging system at the first imaging location after scattering at the surface target facet; and
      light propagated from the illumination source along the second illumination path is received by the imaging system at the second imaging location when total-internal-reflectance is substantially frustrated by the presence of a biometric feature on the surface target facet.

14. The combined multispectral and total-internal-reflectance biometric imaging system recited in claim 13, wherein light propagated from the illumination source along the second illumination encounters at least one facet of the platen that comprises an optical absorber.

15. The combined multispectral and total-internal-reflectance biometric imaging system recited in claim 13, wherein the illumination source comprises a plurality of illumination sources, a first of the illumination sources being disposed to provide light along the first illumination path and a second of the illumination sources being disposed to provide light along the second illumination path.

16. The combined multispectral and total-internal-reflectance biometric imaging system recited in claim 15, wherein at least one of the first and second of the illumination sources is substantially monochromatic.

17. The combined multispectral and total-internal-reflectance biometric imaging system recited in claim 15, wherein at least one of the first and second illumination sources comprises a broad-band illumination source.

18. The combined multispectral and total-internal-reflectance biometric imaging system recited in claim 13, wherein the optical arrangement comprises at least one polarizer.

19. The combined multispectral and total-internal-reflectance biometric imaging system recited in claim 18, wherein the at least one polarizer comprises a polarizer arrangement selected from the group consisting of: a polarizer arrangement that provides for substantially parallel-polarization imaging by the imaging system; and a polarizer arrangement that provides for substantially crossed-polarization imaging by the imaging system.

20. The combined multispectral and total-internal-reflectance biometric imaging system recited in claim 13, wherein light from the first illumination path exits the platen through a first exit facet, light from the second illumination path exits the platen through a second exit facet, and the first exit facet and the second exit facet are not parallel.

21. A method of capturing multispectral and total-internal-reflectance biometric images, wherein the method comprises the steps of:
   propagating light from an illumination source along a first illumination path and encounters a surface target facet of a platen at a first angle measured from a normal to the surface target facet that is less than the critical angle, the critical angle being defined as the smallest angle measured from the normal at which light incident on the surface target platen is substantially totally reflected;
   collecting light propagated from the illumination source along the first illumination path with an imaging system at a first imaging location;
   propagating light from an illumination source along a second illumination path that encounters the surface target platen at a second angle measured from the normal to the surface target facet that is greater than then critical angle; and
   collecting light propagated from the illumination source along the second illumination path with the imaging system at a second imaging location;

wherein:
light propagated along the first illumination path is collected by the imaging system after scattering by the surface target; and
light propagated along the second illumination path is collected by the imaging system when total-internal-reflectance is frustrated by the presence of a purported skin site at the surface target.

22. The method of capturing multispectral and total-internal-reflectance biometric images as recited in claim 21, wherein the steps propagating light from an illumination source along a first illumination path and propagating light from an illumination source along a second illumination path occur simultaneously.

23. A biometric imaging system, wherein the biometric imaging system comprises:
a platen with a plurality of facets;
first illumination source;
a second illumination source; and
an imaging system;
wherein:
at least one facet of the platen comprises a surface target adapted to receive a purported skin site;
the imaging system is disposed to receive light scattered from the surface target facet along a first illumination path and a second illumination path;
light from the first light source enters the platen through a first entrance facet;
light from the second light source enters the platen through a second entrance facet that is not parallel with the first entrance facet;
light scattered from the surface target facet along the first illumination path exits the platen through a first exit facet;
light scattered from the surface target facet along the second illumination path exits the platen through a second exit facet; and
the first exit facet and the second exit facet are not parallel.

24. The biometric imaging system recited in claim 23, wherein at least one facet of the platen comprising an optical absorber.

25. The biometric imaging system recited in claim 24, wherein light propagated along the second illumination path substantially undergoes total-internal-reflectance at the surface target facet and encounters the optical absorber.

* * * * *